(12) United States Patent
Halberstadt

(10) Patent No.: US 10,116,199 B1
(45) Date of Patent: Oct. 30, 2018

(54) APPARATUS AND METHOD FOR LINEARIZATION OF THE CONTROL INPUTS FOR A DUAL OUTPUT RESONANT CONVERTER

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/880,319

(22) Filed: Jan. 25, 2018

(51) Int. Cl.
  *H02M 3/335* (2006.01)
  *H02M 1/08* (2006.01)
  (Continued)

(52) U.S. Cl.
  CPC ....... *H02M 1/083* (2013.01); *H02M 3/33523* (2013.01); *H02M 3/33569* (2013.01); *H02M 2001/0058* (2013.01); *H05B 33/0815* (2013.01)

(58) Field of Classification Search
  None
  See application file for complete search history.

(56) References Cited

U.S. PATENT DOCUMENTS 6,829,151 B2 * 12/2004 Elferich ............ H02M 3/33561
  363/17
6,829,551 B2   12/2004 Elferich et al.
  (Continued)

FOREIGN PATENT DOCUMENTS

EP   2547176 A1   1/2013
EP   3068027 A1   9/2016
  (Continued)

OTHER PUBLICATIONS

U.S. Appl. No. 15/374,562 for Halberstadt filed Dec. 9, 2016, entitled "Dual Output Power Converter and Method for Operating a Dual Output Power Converter".

*Primary Examiner* — Jeffrey Gblende

(57) ABSTRACT

A power converter including: a dual output resonant converter including a first output, a second output, a common mode control input, and a differential mode control input, wherein a voltage/current at the first output and a voltage/current at the second output are controlled in response to a common mode control signal received at the common mode control input and a differential mode control signal received at the differential mode control input; and a dual output controller including a first error signal input, a second error signal input, a delta power signal input, a common mode control output, and a differential mode control output, wherein the dual output controller is configured to generate the common mode control signal and the differential mode control signal in response to a first error signal received at the first error signal input and a second error signal received at the second error signal input, wherein the first error signal is a function of the voltage/current at the first output and the second error signal is a function of the voltage/current at the second output, and wherein the common mode control signal is output from the common mode control output and the differential mode control signal is output from the differential mode control output, wherein the common mode control signal is generated using a feedback loop that uses a desired delta power signal based upon the first error signal and the second error signal and a delta power signal that is a function of the difference in output power at the first output and the second output.

18 Claims, 25 Drawing Sheets

(51) Int. Cl.
*H05B 33/08* (2006.01)
*H02M 1/00* (2006.01)

(56) References Cited

U.S. PATENT DOCUMENTS

| | | |
|---|---|---|
| 8,228,881 B2 | 7/2012 | Kim et al. |
| 8,339,817 B2 | 12/2012 | Halberstadt |
| 9,065,350 B2 | 6/2015 | Halberstadt |
| 2007/0075689 A1* | 4/2007 | Kinder ................ H02M 3/1582 |
| | | 323/259 |
| 2009/0239559 A1* | 9/2009 | Hollis ................ H04L 25/0276 |
| | | 455/500 |
| 2011/0068757 A1* | 3/2011 | Xu ........................ H02M 3/158 |
| | | 323/271 |
| 2013/0016533 A1* | 1/2013 | Halberstadt ......... H02M 3/3376 |
| | | 363/21.02 |
| 2016/0308433 A1* | 10/2016 | Shen .................... H02M 3/158 |

FOREIGN PATENT DOCUMENTS

| | | |
|---|---|---|
| WO | 2005112238 A2 | 11/2005 |
| WO | 2009/004582 A1 | 1/2009 |

\* cited by examiner

| vcm | vdm | Iout1 at vcm,vdm | Iout2 at vcm,vdm | Iout1 at vcm+0.05 | Iout2 at vcm+0.05 | Iout1 at vdm+0.05 | Iout2 at vdm+0.05 | δiout1_dvcm | δiout1_dvcm | δiout2_dVcm | δiout2_dVcm |
|---|---|---|---|---|---|---|---|---|---|---|---|
| 0.6 | 0 | 15.798 | 15.786 | 17.435 | 13.698 | 17.08 | 17.03 | 32.74 | 25.64 | -41.76 | 24.88 |
| 0.5 | 0 | 13.185 | 13.199 | 15.099 | 11.441 | 14.462 | 14.743 | 38.28 | 25.54 | -35.16 | 30.88 |
| 0.4 | 0 | 10.735 | 10.738 | 12.999 | 8.363 | 12.02 | 11.945 | 45.28 | 25.7 | -47.5 | 24.14 |
| 0.3 | 0 | 8.298 | 8.094 | 10.59 | 5.89 | 9.263 | 9.501 | 45.84 | 19.3 | -44.08 | 28.14 |
| 0.2 | 0 | 5.506 | 5.688 | 8.464 | 2.868 | 6.999 | 6.904 | 59.16 | 29.86 | -56.4 | 24.32 |
| 0.1 | 0 | 2.959 | 2.949 | 5.599 | 0.92 | 4.306 | 4.279 | 52.8 | 26.94 | -40.58 | 26.6 |

FIG. 4

APPARATUS AND METHOD FOR LINEARIZATION OF THE CONTROL INPUTS FOR A DUAL OUTPUT RESONANT CONVERTER

TECHNICAL FIELD

Various exemplary embodiments disclosed herein relate generally to a method and apparatus for linearization of the control inputs for a dual output resonant converter.

BACKGROUND

For power converters operating at powers larger than approximately 100 watts (W) at full load, a resonant topology provides a solutions with high efficiency and small volumes/high power density. At power levels above 100 watts, the extra cost compared to other topologies (e.g., an extra switch, extra secondary diode, resonant capacitor) is compensated for by additional advantages of the resonant topology. There are several types of resonant converters, such as a series resonant converter, an LLC converter, and an LCC converter. The series resonant converter uses a resonant capacitor, Cr, and an inductor, Ls, as resonating components while LLC and LCC converters use three resonant components. For an LLC converter, the magnetizing inductance of the transformer takes part in the resonance, while for an LCC converter, an extra capacitor, which takes part in the resonance, is present at the secondary side of the transformer.

Resonant power supplies are being used in light emitting diode (LED) television applications to provide a low voltage output of about 12V DC that supplies the low voltage circuits and a high voltage output of around 165V that supplies the LED strings for the backlight of the display. Such resonant power supplies typically include a main regulation loop that senses the 12V output and regulates the power level of the converter in order to keep the 12V output constant while the load varies. The 165V output then follows the 12V by a more or less fixed ratio as set by the turns ratio of the resonant transformer. Because the 165V output is not regulated, the output voltage of the 165V output can vary considerably with load variations on both the 165V output and the 12V output. Thus, a second control stage is often used after the 165V output to provide for a more accurate supply voltage for the LED strings. However, a second control stage adds cost to such resonant power supplies.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a power converter including: a dual output resonant converter including a first output, a second output, a common mode control input, and a differential mode control input, wherein a voltage/current at the first output and a voltage/current at the second output are controlled in response to a common mode control signal received at the common mode control input and a differential mode control signal received at the differential mode control input; and a dual output controller including a first error signal input, a second error signal input, a delta power signal input, a common mode control output, and a differential mode control output, wherein the dual output controller is configured to generate the common mode control signal and the differential mode control signal in response to a first error signal received at the first error signal input and a second error signal received at the second error signal input, wherein the first error signal is a function of the voltage/current at the first output and the second error signal is a function of the voltage/current at the second output, and wherein the common mode control signal is output from the common mode control output and the differential mode control signal is output from the differential mode control output, wherein the common mode control signal is generated using a feedback loop that uses a desired delta power signal based upon the first error signal and the second error signal and a delta power signal that is a function of the difference in output power at the first output and the second output.

Various embodiments are described, wherein the dual output controller is configured to generate the common mode control signal and the differential mode control signal in response to the first error signal and the second error signal by precalculating a control variable matrix and generating the common mode control signal and the differential mode control signal as a function of the first and second error signals and the control variable matrix.

Various embodiments are described, wherein the control variable matrix includes variables k11, k12, k21, and k22, wherein the desired delta power signal and the differential mode control signal are generated as: desired_delta_power=first error signal·k21+second error signal·k22; and $$Vdm = \text{first error signal} \cdot k11 + \text{second error signal} \cdot k12.$$

Various embodiments are described, wherein the feedback loop further including: an adder configured to calculate a difference between the desired delta power signal and difference in output power at the first output and the second output; and a regulator configured to receive the output of the adder to generate the common mode control signal.

Various embodiments are described, further including a clamping circuit configured to clamp the common mode control signal to a range of values.

Various embodiments are described, wherein the clamping circuit further includes: a power detector configured to produce an indication signal when the output power of the first output approaches zero; and a limit detector configured to receive the common mode signal and the indication signal to produce a limited common mode signal based upon the range of values.

Various embodiments are described, wherein the limit detector is further configured to produce an overrule signal that is received by the feedback and loop and that stops the operation of the feedback loop when the common mode signal is limited.

Various embodiments are described, wherein the power detector includes a reference input configured to receive a reference signal and a voltage/current input that receives a voltage/current signal from the first output, wherein the indication signal produced based upon the reference signal the voltage/current signal from the first output.

Various embodiments are described, wherein the power detector includes an auxiliary voltage input configured to receive an auxiliary voltage signal from an auxiliary coil coupled to a secondary of the dual output resonant converter, wherein the indication signal is produced based upon the auxiliary voltage signal.

Various embodiments are described, wherein the power detector is configured to detect that the auxiliary voltage is below threshold value based upon a maximum detected auxiliary voltage value.

Various embodiments are described, wherein the power detector includes an auxiliary voltage input configured to receive an auxiliary voltage signal from an auxiliary coil coupled to a secondary of the dual output resonant converter and a switching node voltage input that receives a switching mode voltage signal from a switching node in the dual output resonant converter, wherein the indication signal is produced based upon the auxiliary voltage signal and the switching node voltage signal indicating the beginning a continuous conduction mode (CCM) of operation of the dual output resonant converted.

Various embodiments are described, wherein the power detector further includes: a zero crossing detector configured to determine a first time when the auxiliary voltage crosses zero; a start slope detector configured to determine a second time when the switching node voltage starts to have a slope; and time difference detector configured to determine a difference between the first time and the second time, wherein the time difference indicates the beginning of the CCM of operation of the dual output resonant converted.

Further various embodiments relate to a power converter including: a dual output resonant converter including a first output, a second output, a duty cycle control input, and a frequency control input, wherein a voltage/current at the first output and a voltage/current at the second output are controlled in response to a duty cycle control signal received at the duty cycle control input and a frequency control signal received at the frequency control input; and a dual output controller including a duty cycle control output and a frequency control output, wherein the dual output controller is configured to generate the duty cycle control signal and the frequency control signal in response to the voltage/current at the first output and a voltage/current at the second output, wherein the duty cycle control signal is generated using a first feedback loop that uses a desired delta power signal based upon the voltage/current at the first output and a voltage/current at the second output and a delta power signal that is a function of the difference in output power at the first output and the second output and wherein the frequency signal is generated using a second feedback loop that uses a desired total power signal based upon the voltage/current at the first output and a voltage/current at the second output and a total power signal that is a function of the total power at the first output and the second output.

Various embodiments are described, wherein: the first feedback loop further includes: an adder configured to calculate a difference between the desired delta power signal and difference in output power at the first output and the second output; and a regulator configured to receive the output of the adder to generate the duty cycle control signal; and the second feedback loop further includes: an adder configured to calculate a difference between the desired total power signal and total output power at the first output and the second output; and a regulator configured to receive the output of the adder to generate the frequency control signal.

Various embodiments are described, further including a clamping circuit configured to clamp the duty cycle control signal to a range of values.

Various embodiments are described, wherein the clamping circuit further includes: a power detector configured to produce an indication signal when the output power of the first output approaches zero; and a limit detector configured to receive the duty cycle control signal and the indication signal to produce a limited duty cycle control signal.

Various embodiments are described, wherein further including a clamping circuit configured to clamp the frequency control signal to a range of values.

Various embodiments are described, wherein the clamping circuit further includes: a power detector configured to produce an indication signal when the output power of the first output approaches zero; and a limit detector configured to receive the frequency control signal and the indication signal to produce a limited frequency control signal.

BRIEF DESCRIPTION OF THE DRAWINGS

In order to better understand various exemplary embodiments, reference is made to the accompanying drawings, wherein:

FIG. 4 is a table of some of the data points in the graph of FIG. 3 along with some corresponding partial derivative values;

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
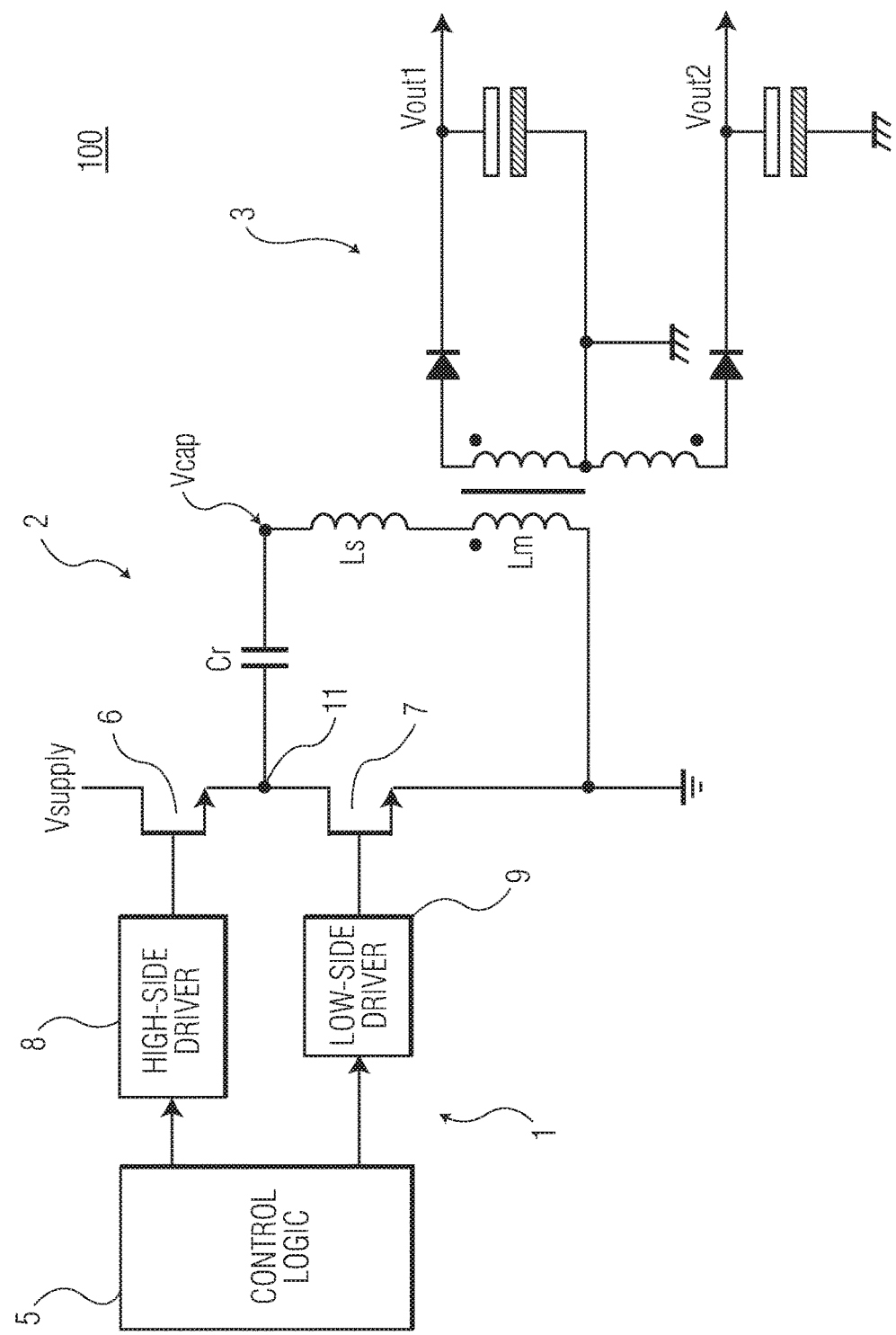
FIG. 1 depicts and embodiment of a dual output resonant converter.

Dual output resonant converters are known. Examples of dual output resonant converters are disclosed in U.S. Pat. No. 6,822,881 and U.S. Pat. No. 6,829,151. An embodiment of a dual output resonant converter 100 is depicted in FIG. 1. In the embodiment of FIG. 1, the circuit is a resonant LLC converter that includes a resonant capacitor, Cr, and inductor, Ls, and magnetizing inductance, Lm, which are components that form part of a resonant circuit or a resonant tank. Transformer and rectifier circuits are used to create DC output voltages, Vout1 and Vout2. The output current can be made continuous by adding a series inductance (not shown).

In an embodiment of FIG. 1, the circuit includes three parts. A first part 1 is the control part, which includes control logic, 5, for generating control signals for opening and closing the switches, 6 and 7, by means of a high-side driver (HSD) 8 and a low-side driver (LSD) 9, respectively. A second part 2 is the primary circuit and a third part 3 is the secondary circuit. The second part includes the resonant capacitor, Cr, and the inductors, Ls and Lm. The resonant converter is connected to a voltage supply, Vsupply, (also referred to herein as Vbus) so that electrical energy may be supplied to a load that, for example, may be connected to output terminals at the secondary side. In an embodiment, the switches, 6 and 7, are series-arranged, controllable switches that are connected to the voltage supply, Vsupply, the first switch being a high-side switch (HSS), the high-side switch being connected at one leg to the voltage supply, Vsupply, the second switch being a low-side switch (LSS), the low-side switch being connected at one leg to ground. Also, an embodiment with a full bridge configuration can be envisioned. The third part may include diodes and capacitors as is known in the field.

The dual output resonant converter 100 is typically controlled by a frequency. The output power of the converter may be controlled by varying the signal frequency. It is also possible to use a duty cycle different from 50%. In this case, the duty cycle also influences how the output power is divided between both outputs. A drawback to frequency and duty cycle based control may be that for certain operating points it becomes difficult to regulate the system to the desired operating point because of changes in gain factors due to nonlinear control behavior of a frequency or duty cycle controlled resonant converter and even changes in polarity.

Various techniques for operating resonant converters are known. One technique as disclosed in U.S. Pat. No. 7,944,716, which is incorporated by reference herein for all purposes as if fully set forth herein, involves combining control of the duty cycle and the frequency in such a way that a smooth regulation of the output power can be realized. For example, the resonant converter is not controlled by frequency and duty cycle directly, but with current and voltage at the primary side of the transformer. In an embodiment, current and voltage in the resonant tank, e.g., Iprim and Vcap, are compared each conduction interval with two control values such that the resonant converter is controlled in a cycle-by-cycle manner. In an embodiment, the current, Iprim, is the current flowing in the resonant tank in response to the opening and closing of the switches. Measurement of the current may be provided in various different ways, e.g., from the voltage over a sense resistor, the current in a switch, etc. The current, Iprim, is also referred to as the primary current. Vcap is also referred to as the capacitor voltage, which is the voltage at a predetermined point, such as the node indicated as "Vcap" in FIG. 1. In the example of FIG. 1, the voltage at node Vcap is defined as Vhb−Vcr, where Vhb is the voltage at the half bridge node 11 and Vcr is the voltage across the resonant capacitor. In an example operation, for each half cycle, the conducting primary switch is switched off when the voltage, Vcap, crosses a predefined value for each half cycle (e.g., VcapH for high-side switch turn off and VcapL for low-side switch turn off). By controlling the primary switches in this way, it is possible to get an almost linear relationship between a control parameter and output power.

Further, it is possible to define a differential mode term, Vdm, and a common mode term, Vcm, for use in controlling a resonant converter. For example, the differential mode term may be expressed as $Vdm=Vbus/2-(VcapH-VcapL)/2$ and the common mode term may be expressed as $Vcm=(VcapH+VcapL)/2$. Using the differential mode term and the common mode term, it is possible to control both the total power that is delivered to the output using the differential mode term, Vdm, while the difference in output power that is delivered to the output during each half cycle is determined by the common mode term, Vcm.

It is possible to use the voltage across a resonant capacitor, Vcr, or the voltage at the node Vcap to implement a control scheme that utilizes a differential mode term and a common mode term. The techniques involving Vcap and Vcr can yield similar control functionality. However, a difference between using Vcap control versus Vcr control is that the average value of Vcap is per definition zero, while for Vcr, a DC component, Vbus/2, is present, which makes it possible to use a capacitive divider to divide Vcap down to a low voltage signal that is compatible with a low voltage controller integrated circuit (IC). While the DC component is Vbus/2 for Vcr control at a 50% duty cycle, for duty cycles other than 50%, the DC component is Vbus/2×duty cycle, where the duty cycle is the high-side switch conduction time divided by the period time.

Additional techniques for operating resonant converters that use a differential mode term, Vdm, and a common mode term, Vcm, to control a resonant converter are disclosed in U.S. Pat. No. 9,065,350, and European Patent Application No. 11250662.1 (Published as EP 2 547 176 A1, on Jan. 16, 2013), which are incorporated by reference herein for all purposes as if fully set forth herein.

In addition to the 50% duty cycle modes or "high power modes," it is also known that it is possible to use "low power modes" to control a resonant converter. Various examples of low power modes for controlling resonant converters are disclosed in for example, U.S. Pat. No. 8,339,817, International Patent Applications Published under the Patent Cooperation Treaty (PCT) as publication numbers WO 2005/112238 and WO 2009/004582, and European Patent Application No. 15159086.6 (Published as EP 3 068 027 A1, on Mar. 13, 2015). In such low power modes, part of a switching sequence is similar to the high power mode, while during another part of the cycle, the resonant tank is in a mode where no energy is converted and where also relatively few losses are produced.

As described above, resonant power supplies are being used in LED television applications to provide a low voltage output of about 12V DC that supplies the low voltage circuits and a high voltage output of around 165V that supplies the LED strings for the backlight of the display. Some known power supplies developed for such applications require a second control stage after the 165V output to provide for a more accurate supply voltage for the LED strings. However, a second control stage adds cost to such resonant power supplies. In accordance with an embodiment described herein, a power converter with a dual output resonant converter is disclosed that does not need a second stage controller for the 165V output. The power converter is controlled using a "capacitor voltage" control technique so that the two outputs of the dual output resonant converter can be controlled independently of each other. In an embodiment, a differential mode control signal, Vdm, and a common mode control signal, Vcm, are used to independently control the two outputs of a dual output resonant converter. In particular, the differential mode control signal, Vdm, and the common mode control signal, Vcm, are adjusted in response to error signals that are generated as a function of the output voltage and/or current of each of the two outputs. For example, a first (e.g., linear) combination of the first and second error signals is used to generate a differential mode control signal and a second (e.g., linear) combination of the first and second error signals is used to generate a common mode control signal. It is noted that the use of the dual output resonant converter in an LED TV application is described, the embodiments described herein may be used in any application using a dual output resonant converter.

Figure 2:
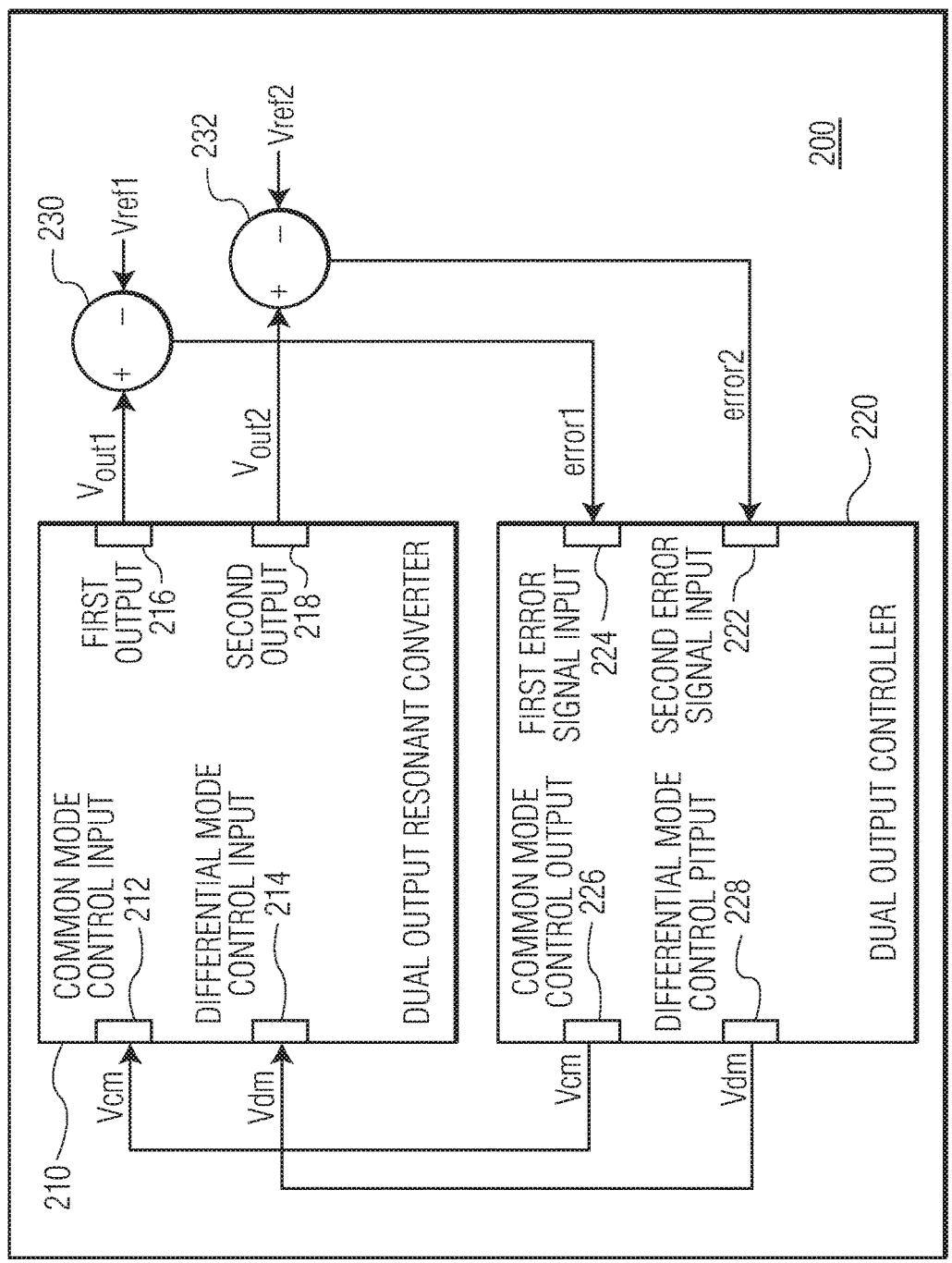
FIG. 2 is a block diagram of an example of a power converter that includes a dual output resonant converter, a dual output controller, and first and second compare units in accordance with an embodiment of the invention.

A technique for controlling a dual output resonant converter is first described with reference to FIG. 2. FIG. 2 is a block diagram of an example of a power converter 200 that includes a dual output resonant converter 210, a dual output controller 220, and first and second compare units 230 and 232 in accordance with an embodiment. The dual output resonant converter 210, the first and second compare units 230 and 232, and the dual output controller 220 form a feedback loop that is used to independently control the voltage and/or current at the two outputs of the dual output resonant converter. For example, in an LED television application, the outputs can be independently controlled to provide a 12V output and a 165V output (e.g., within ±10% or within ±5% of the target output) that can be used to drive the different components of an LED television. The dual output resonant converter includes a common mode control input 212, a differential mode control input 214, a first output 216, and a second output 218. The common mode control input 212 receives a common mode control signal, Vcm, and the differential mode control input 214 receives a differential mode control signal, Vdm, while the first output 216 provides an output voltage, Vout1, and the second output 218 provides an output voltage, Vout2. It should be noted that the outputs could also be viewed in terms of an output current, Iout1 and Iout2, respectively.

The compare units 230 and 232 are configured to compare an input voltage to a reference voltage to generate an error signal that can be processed by the dual output controller 220. In an embodiment, the error signals reflect the difference between the output voltage and a reference voltage. For example, the compare units are used so that the 12V and 165V outputs can be transformed to lower voltage signals that can be managed by an IC-based dual output controller, which typically operates at voltages in the range of about 0.5-3 volts. The first compare unit 230 is configured to compare the output, Vout1, from the first output 216 to a first reference signal, Vref1, to generate a first error signal, error1, and the second compare unit 232 is configured to compare the output, Vout2, from the second output 218 to a second reference signal, Vref2, to generate a second error signal, error2. Although the compare units and corresponding signals are described in terms of voltage, the compare units 230 and 232 may be configured as current compare units with corresponding current based signals, e.g., Iout1, Iout2, Iref1, and Iref2.

The dual output controller 220 includes a first error signal input 222, a second error signal input 224, a common mode control output 226, and a differential mode control output 228. The first error signal input 222 receives the first error signal, error1, and the second error signal input 224 receives the second error signal, error2. The common mode control output 226 outputs the common mode control signal, Vcm, and the differential mode control output 228 outputs the differential mode control signal, Vdm.

A power converter with a dual output resonant converter may be controlled based on the voltage at the node, Vcap, which is referred to herein as "Vcap control" or based on the voltage across the resonant capacitor, which is referred to herein as "Vcr control." In an embodiment, the voltage across the resonant capacitor, Vcr, may also include a voltage drop across a sense resistor, Rsense, but as the sense resistor is typically only in the 100 mV range while Vcr is in a range that is greater than 100V, the voltage drop attributable to the sensor resistor is insignificant. Depending on the placement of the resonant capacitor, e.g., in series with the switching node or in series with the ground node, a different signal shape occurs, so the common mode control signal, Vcm, and the differential mode control signal, Vdm, are defined slightly different between both configurations, but the basic principle applied for power converter control is the same. For example, for Vcap control:

VcapH=Vbus/2+Vcm−Vdm;

VcapL=−Vbus/2+Vcm+Vdm;

or written in another way;

Vdm=Vbus/2−(VcapH−VcapL)/2 controls Pout1+ Pout2 with only a small residual effect on Pout1−Pout2;

Vcm=(VcapH+VcapL)/2 controls Pout1−Pout2 with only a small residual effect on Pout1+Pout2;

where Pout1 is the power delivered on the first output 216 of the dual output resonant converter 210 and Pout2 is the power delivered on the second output 218 of the dual output resonant converter.

For Vcr control compared to Vcap control, a one-to-one relationship exists between values, e.g., for every value of VcapH and VcapL one value exists for VcrH and VcrL. For example, for Vcr control:

Vhb=Vcap+Vcr so;

VcapH level is relevant when the high-side switch is on, then Vhb=Vbus so Vcr=Vhb−Vcap gives:

VcrH=Vbus−VcapH;

VcapL level is relevant when low-side switch is on, then Vhb=0 so Vcr=Vhb−Vcap gives:

VcrL=−VcapL;

Vcm=(VcapH+VcapL)/2=((Vbus−VcrH)+(−VcrL))/ 2=Vbus/2−(VcrH+VcrL)/2.

Using Vcap control, the common mode control signal, Vcm, does not depend on Vbus, while with Vcr control, the common mode control signal does depend on Vbus, e.g., Vbus/2. Thus, in an embodiment that uses Vcap control, the differential mode control signal is defined as Vdm=Vbus/ 2−(VcapH−VcapL)/2 and the common mode term is defined as Vcm=(VcapH+VcapL)/2 and in an embodiment that uses Vcr control, the differential mode control signal is defined as Vdm=(VcrH−VcrL)/2 and the common mode term is defined as Vcm=Vbus/2−(VcrH+VcrL)/2. As is described below, in an embodiment, the dual output controller functions the same for both Vcap control and Vcr control.

A consideration in choosing to use Vcap control or Vcr control is related to the specific implementation. For example, with Vcap control, the average voltage of Vcap is zero, Vcap=0 (because the voltage is sensed across an inductor). Therefore, it is easy to use a capacitive divider to translate the amplitude of Vcap (e.g., a few 100V) to IC levels of, for example, a few volts. A capacitive divider cannot transfer DC information, but because the DC information is zero per definition, it is also not required. In an embodiment, the DC term can be set to zero, for example, by connecting a large resistor between the capacitive divider and the ground reference that VcapH and VcapL are referenced to. Vcr control may be selected so that a resonant capacitor can be connected to ground at one side, which enables the resonant capacitor to be split into two capacitors, which may give less ripple current in the supply voltage, Vsupply, also referred to as Vbus.

As described above, the differential mode control signal, Vdm, and a common mode control signal, Vcm, are used to independently control the two outputs of a dual output resonant converter. In particular, the differential mode control signal and the common mode control signal are adjusted in response to error signals, error1 and error2, that are generated as a function of the output voltage and/or current, Vout1/Iout1 and Vout2/Iout2, of each of the two outputs. An example of a technique for deriving the functional relationships between Vcm, Vdm, error1, and error2 is described below.

Figure 3:
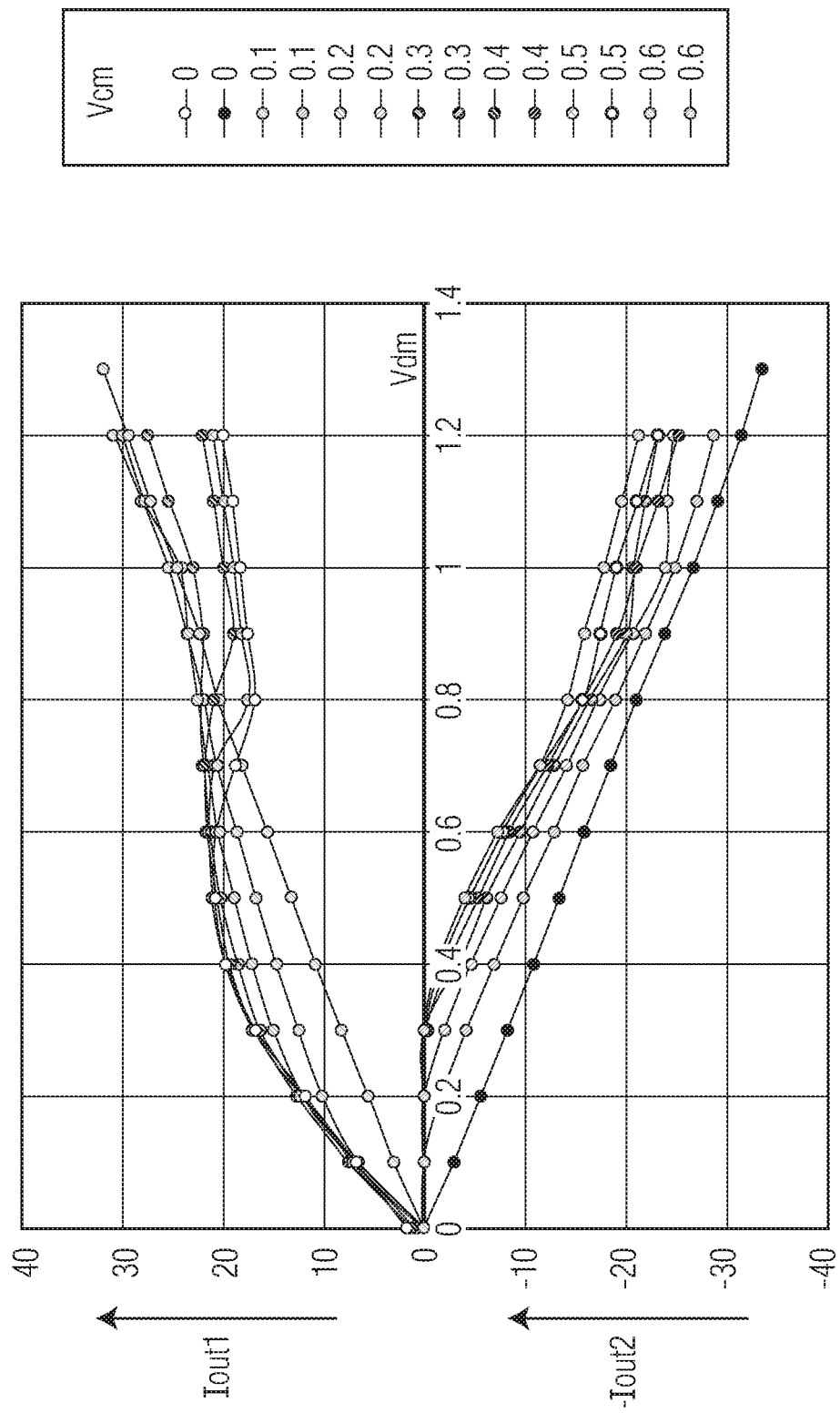
FIG. 3 is a graph of simulation results for a power converter that includes a dual output resonant converter.

In the power converter 200 depicted in FIG. 2, the error signal generated for one of the outputs should drive the combination of Vcm and Vdm in the proper ratio such that only power to the desired output changes and the power to the other output stays constant. For example, the error signal corresponding to the first output, error1, should drive changes to the output at the first output, Vout1, of the dual output resonant converter with little effect (e.g., ±1% change) on the output at the second output, Vout2, of the dual output resonant converter while the error signal corresponding to the second output, error2, should drive the changes to the output at the second output, Vout2, of the dual output resonant converter with little effect on the first output, Vout1, of the dual output resonant converter. Such a control scheme is referred to herein as "orthogonal" control. In order to achieve orthogonal control, in an embodiment, a first step is to describe how the output current (e.g., Iout1 and Iout2) at each output changes with changes in Vcm and Vdm. The change in output current at each output as a function of changes in Vcm and Vdm can be described as the total differential of each output based on partial derivatives as follows:

$dIout1 = \delta iout1\_dVcm \cdot dVcm + \delta iout1\_dVdm \cdot dVdm$ $dIout2 = \delta iout2\_dVcm \cdot dVcm + \delta iout2\_dVdm \cdot dVdm$ These partial derivatives can then be determined for a particular configuration of a dual output resonant converter operating over a set of known operating points. FIG. 3 is a graph of simulation results for a power converter that includes a dual output resonant converter as described above with reference to FIGS. 1 and 2. In the example of FIG. 3, the output current at two outputs, Iout1 and −Iout2, is plotted for different values of the common mode control signal, Vcm, and for different values of the differential mode control signal, Vdm. In the example of FIG. 3, Vcm and Vdm correspond to the signal derived from the Vcap or Vcr node by a voltage divider in order to get voltages at a scale applicable to an IC input. For example, the output currents, Iout1 and −Iout2, are plotted over a range of common mode control signals, Vcm, from 0-0.6V and over a range of differential mode controls signals, Vdm, from 0-1.4V. FIG. 4 is a table of some of the data points in the graph of FIG. 3 along with some corresponding partial derivative values.

In an embodiment, it is desired to determine the change in the differential mode control signal, Vdm, and the change in the common mode control signal, Vcm, needed in order to get a certain output current change at only one output (e.g., either Iout1 or Iout2), while leaving the output current at the other output unchanged, e.g., unchanged within a range of about ±1% of full power of the output. In an embodiment, the differential mode control signal, Vdm, and the common mode control signal, Vcm, can be solved from the following set of equations:

$$dIout1 = \delta iout1\_dVcm \cdot dVcm + \delta iout1\_dVdm \cdot dVdm$$

$$dIout2 = \delta iout2\_dVcm \cdot dVcm + \delta iout2\_dVdm \cdot dVdm$$

Which gives, the matrix operation:

$$\begin{pmatrix} dIout1 \\ dIout2 \end{pmatrix} = \begin{pmatrix} \delta iout1\_dVcm & \delta iout1\_dVdm \\ \delta iout2\_dVcm & \delta iout2\_dVdm \end{pmatrix} \cdot \begin{pmatrix} dVcm \\ dVdm \end{pmatrix}$$

Using the data in the example of FIGS. 3 and 4, at the operating point Vcm=0 and Vdm=0.4, the derivatives are determined as:

$$\delta iout1\_dVcm=45.28 \quad \delta iout1\_dVdm=25.7$$

$$\delta iout2\_dVcm=-47.5 \quad \delta iout2\_dVdm=24.14$$

The above values can then be applied to the equations below:

$$dVcm = \frac{\left|\begin{pmatrix} dIout1 & \delta out1\_dVdm \\ diout2 & \delta out2\_dVdm \end{pmatrix}\right|}{\left|\begin{pmatrix} \delta iout1\_dVcm & \delta iout1\_dVdm \\ \delta iout2\_dVcm & \delta iout2\_dVdm \end{pmatrix}\right|}$$

and $$dVdm = \frac{\left|\begin{pmatrix} \delta out1\_dVcm & dIout1 \\ \delta iout2\_dVcm & dIout2 \end{pmatrix}\right|}{\left|\begin{pmatrix} \delta iout1\_dVcm & \delta iout1\_dVdm \\ \delta iout2\_dVcm & \delta iout2\_dVdm \end{pmatrix}\right|}$$

In an example, the changes needed in the values of the differential mode control signal, Vdm, and the common mode control signal, Vcm, to achieve an output current change of 1 amp in each output can be determined from the above equations being a function of (dIout1,dIout2). For example, the changes needed in the values of Vdm and Vcm are calculated as:

$$dVcm(1,0)=-11.107 \text{ ml} \quad dVcm(0,1)=10.433 \text{ ml} \quad dVcm(1,1)=-0.674 \text{ ml}$$

$$dVdm(1,0)=19.569 \text{ ml} \quad dVdm(0,1)=20.529 \text{ ml} \quad dVdm(1,1)=40.098 \text{ ml}$$

Figure 5:
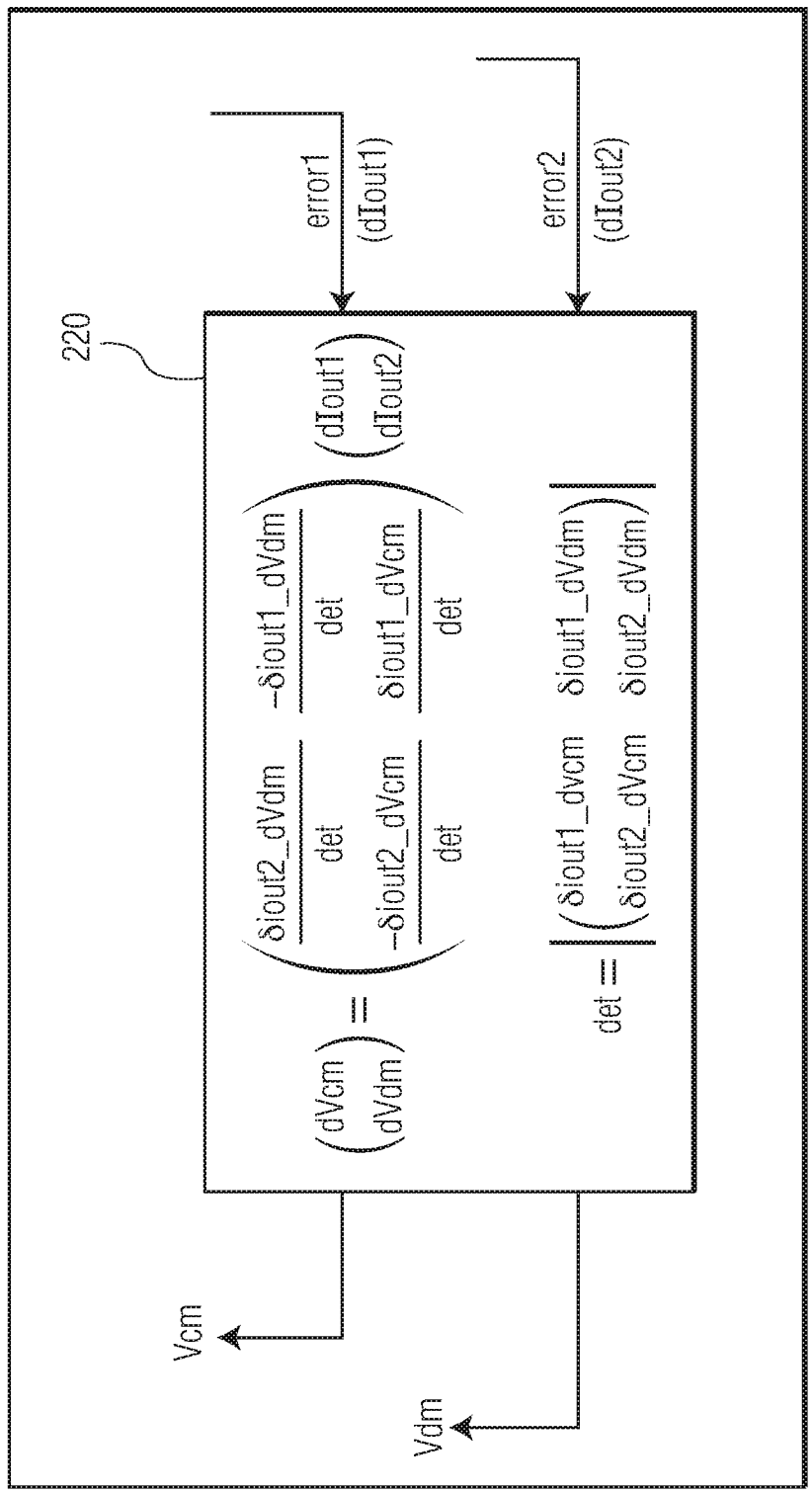
FIG. 5 illustrates an example of the control function that is performed by the dual output controller.

An example control function of an embodiment of the dual output controller 220 is illustrated in FIG. 5. As illustrated in FIG. 5, the common mode control signal, Vcm, and the differential mode control signal, Vdm, are generated as a function of the input error signals, error1 (monitored as dIout1) and error2 (monitored as dIout2). The values of the control parameters can be solved for and referred to in general as control parameters k11, k12, k21, and k22. The control parameters can be represented in a control parameter matrix of:

$$\begin{pmatrix} k11 & k12 \\ k21 & k22 \end{pmatrix}$$

With reference to FIG. 5, a determinant is used to solve the set of linear equations in a structural way, e.g., as the quotient of two determinants. The determinant can be expressed as:

$$\det = \left|\begin{pmatrix} \delta iout1\_dVcm & \delta iout1\_dVdm \\ \delta iout2\_dVcm & \delta iout2\_dVdm \end{pmatrix}\right| =$$

$$\delta iout1\_dVcm \cdot \delta iout2\_dVdm - \delta iout1\_dVdm \cdot \delta iout2 dVcm$$

And the set of equations can be solved as:

$$dVcm(dIout2, dIout1) =$$

$$\frac{dIout2 \cdot \delta iout1\_dVcm - dIout1 \cdot \delta iout2\_dVcm}{\delta iout1\_dVcm \cdot \delta iout2\_dVdm - \delta iout1\_dVdm \cdot \delta iout2\_dVcm}$$

$$dVdm(dIout2, dIout1) =$$

$$\frac{dIout1 \cdot \delta iout2\_dVcm - dIout2 \cdot \delta iout1\_dVcm}{\delta iout1\_dVcm \cdot \delta iout2\_dVdm - \delta iout1\_dVdm \cdot \delta iout2\_dVcm}$$

Given the simulated values identified above:

$$\delta iout1\_dVcm=45.28 \quad \delta iout1\_dVdm=25.7$$

$$\delta iout2\_dVcm=-47.5 \quad \delta iout2\_dVdm=24.14$$

The control parameters k11, k12, k21, and k22 for the particular configuration of the dual output resonant converter are precalculated as:

$$k11 = \frac{\delta iout2\_dVdm}{\det}$$

$$k11 = 0.011$$

$$k12 = \frac{-\delta iout1\_dVdm}{\det}$$

$$k12 = -0.011$$

$$k21 = \frac{-\delta iout2\_dVcm}{\det}$$

$$k21 = 0.019$$

$$k22 = \frac{\delta iout1\_dVcm}{\det}$$

$$k22 = 0.019$$

As shown above, a set of control parameters may be precalculated for a particular configuration of a dual output resonant converter that is operated and/or simulated over a known set of operating points. In an embodiment, the control parameters k11 and k12 are used by the dual output controller to set the common mode control signal, Vcm, and the control parameters k21 and k22 are used by the dual output controller to set the differential mode control signal, Vdm. In an embodiment, for symmetry reasons, when adapting the feedback loop starting from a symmetrical operating point where both outputs are equally loaded, k11 and k12 should be opposite, while k21 and k22 should be equal. Although certain values for the control parameters k11, k12, k21, and k22 are found for an example power converter and an example set of operating points, it should be understood that the particular values of the control parameters are implementation specific. With the values of the control parameters predetermined, the values of the common mode control signal, Vcm, and the differential mode control signal, Vdm, can be generated using relatively simple calculations based on the error values, error1 and error2. Thus, the two outputs of the dual output resonant converter can be independently controlled in a feedback control loop that utilizes two inputs and very little additional control circuitry.

Figure 6A:
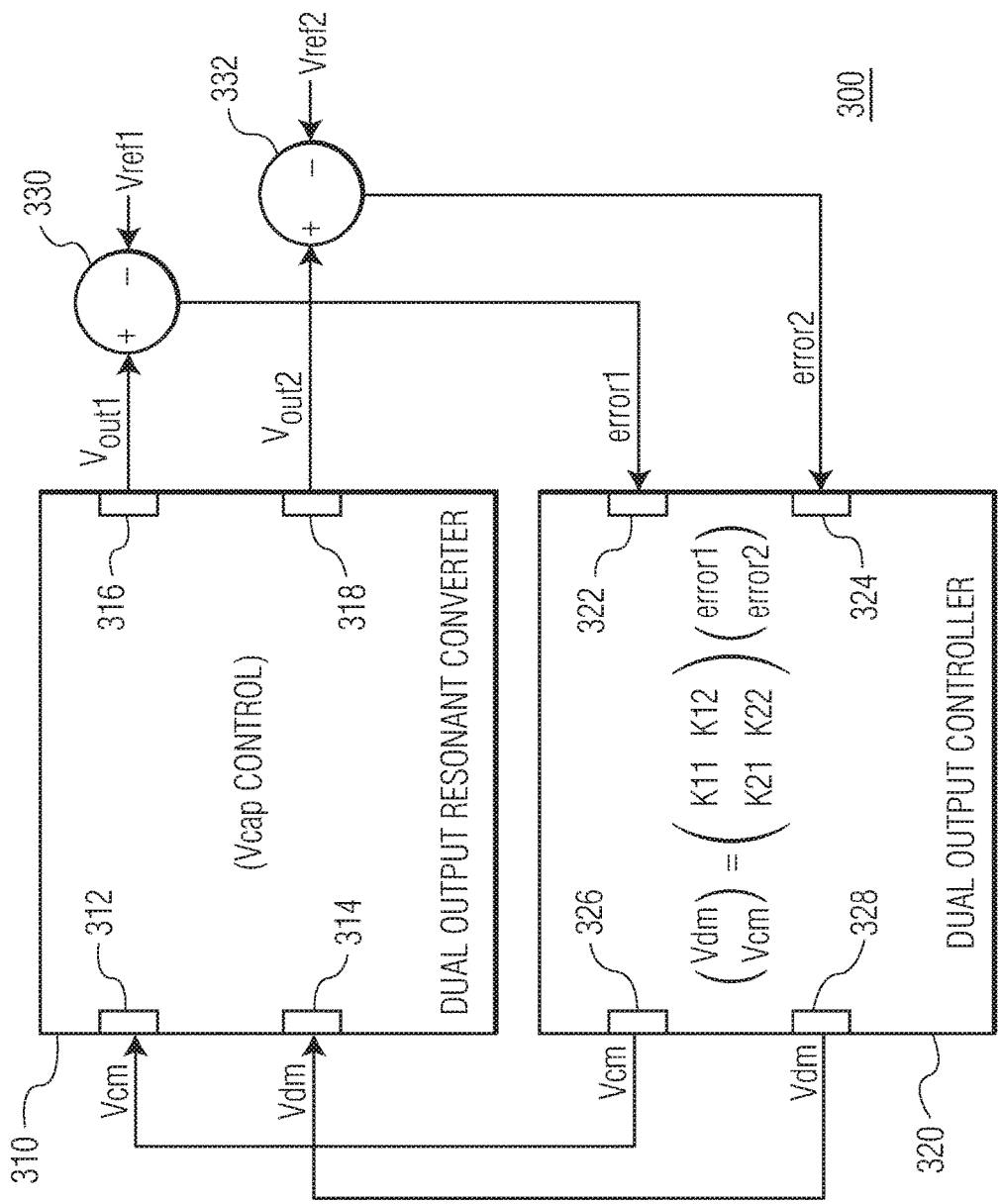
FIG. 6A is a block diagram of an example of a power converter that is configured for Vcap or Vcr control.

FIG. 6A is a block diagram of an example of a power converter 300 that is configured for Vcap control. The power converter can be similar to or the same as the power converter 200 of FIG. 2 and includes a dual output resonant converter 310, a dual output controller 320, and first and second compare units 330 and 332 in accordance with an embodiment of the invention. The dual output resonant converter 310, the first and second compare units 330 and 332, and the dual output controller 320 form a feedback loop as described above with reference to FIG. 2. The dual output resonant converter 310 includes a common mode control input 312, a differential mode control input 314, a first output 316, and a second output 318. The common mode control input 312 receives a common mode control signal, Vcm, and the differential mode control input 314 receives a differential mode control signal, Vdm, while the first output 316 provides an output voltage, Vout1, and the second output 318 provides an output voltage, Vout2. It should be noted that the outputs could also be viewed in terms of an output current, Iout1 and Iout2, respectively.

The compare units 330 and 332 are configured to compare an input voltage to a reference voltage to generate an error signal. The first compare unit 330 is configured to compare the output, Vout1, from the first output to a first reference signal, Vref1, to generate a first error signal, error1, and the second compare unit 332 is configured to compare the output, Vout2, from the second output to a second reference signal, Vref2, to generate a second error signal, error2. Although the compare units 330 and 332 and corresponding signals are described in terms of voltage, the compare units 330 and 332 could be configured as current compare units, with corresponding current based signals or as power based compare units for power-based regulation of the power converter.

The dual output controller 320 includes a first error signal input 322, a second error signal input 324, a common mode control output 326, and a differential mode control output 328. The first error signal input 322 receives the first error signal, error1, and the second error signal input 324 receives the second error signal, error2. The common mode control output 326 outputs the common mode control signal, Vcm, and the differential mode control output 328 outputs the differential mode control signal, Vdm. As illustrated in FIG. 6A, the dual output controller 320 generates the common mode control signal, Vcm, and the differential mode control signal, Vdm, in response to the error signals, error1 and error2. To generate the common mode control signal, Vcm, and the differential mode control signal, Vdm, the dual output controller 320 is configured with a control parameter matrix of:

$$\begin{pmatrix} k11 & k12 \\ k21 & k22 \end{pmatrix}$$

and the control function can be expressed as:

$$\begin{pmatrix} Vdm \\ Vcm \end{pmatrix} = \begin{pmatrix} k11 & k12 \\ k21 & k22 \end{pmatrix} \cdot \begin{pmatrix} error1 \\ error2 \end{pmatrix}$$

The control parameter matrix, which was described above, includes the parameters k11, k12, k21, and k22. The common mode control signal, Vcm, and the differential mode control signal, Vdm, can be generated as:

Vcm=error1·k21+error2·k22; and

Vdm=error1·k11+error2·k12.

Thus, the control parameters k11-k22 define how the differential mode control signal, Vdm, and the common mode control signal, Vcm, change in response to changes in the error signals, error1 and error2. In an embodiment, the generation of the error signals, error1 and error2, includes an amplifier with frequency dependent behavior. Ultimately, the function is the specific linear combination of Vcm and Vdm to achieve orthogonal control. As described above, the relationship between control parameters k11 and k21 determines how Vcm and Vdm change in response to changes in the error signal, error1, such that a response is seen only at the first output, e.g., as Vout1/Iout1, and the relationship between control parameters k12 and k22 determines how Vcm and Vdm change in response to changes in the error signal, error2, such that a response is only seen at the second output, e.g., as Vout2/Iout2.

Figure 6B:
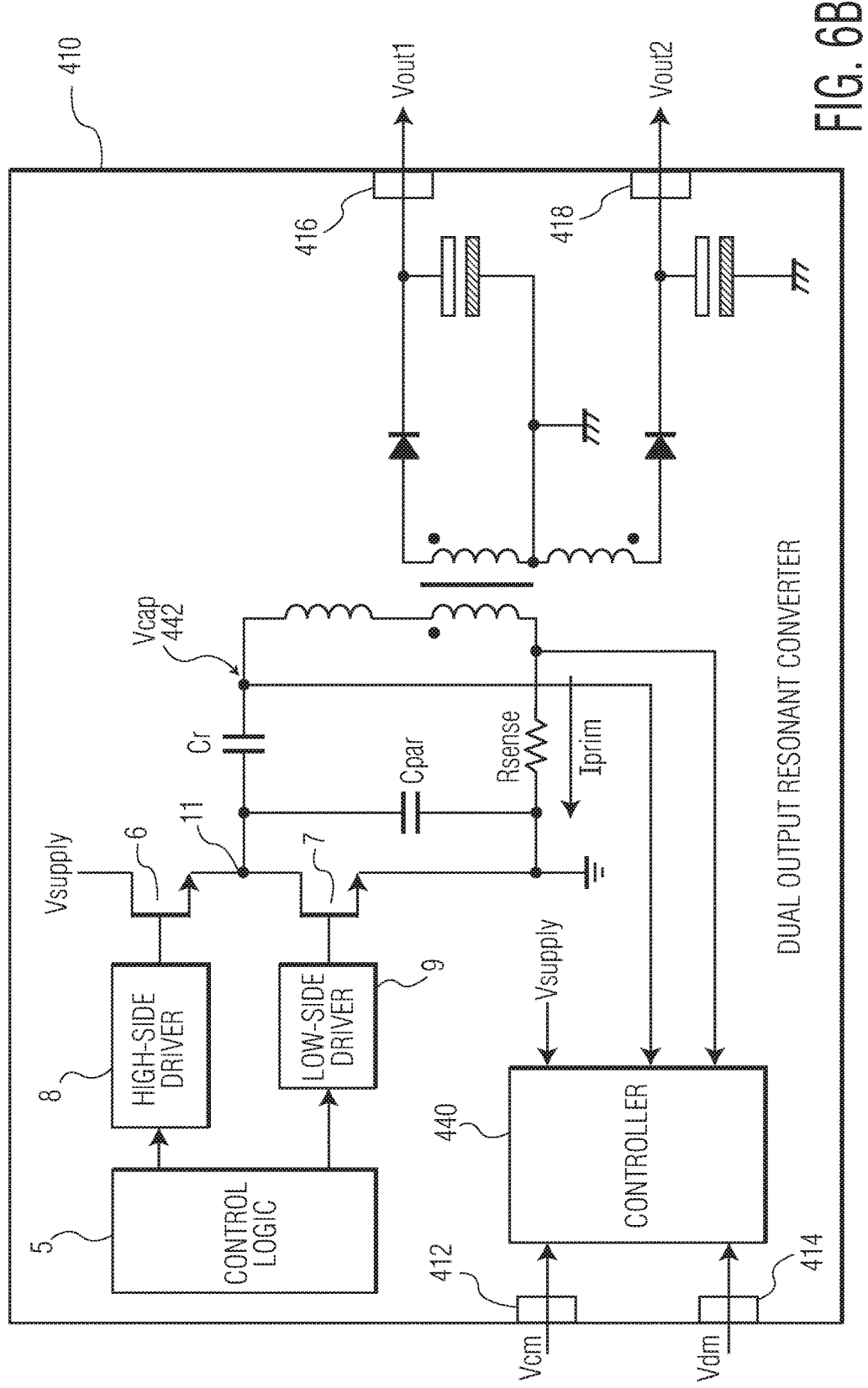
FIG. 6B depicts an embodiment of a dual output resonant converter that is configured for Vcap control.

FIG. 6B depicts an embodiment of a dual output resonant converter 410 that is configured for Vcap control. The dual output resonant converter 410 is similar to the dual output resonant converter described with reference to FIG. 1. However, the dual output resonant converter shown in FIG. 6B includes a controller 440 that is configured to generate switch control signals in response to the common mode control signal, Vcm, the differential mode control signal, Vdm, and the voltage at node 442. As shown in FIG. 6B, node 442 is identified as the "Vcap" node, e.g., the node at which Vcap is measured. In the circuit of FIG. 6B, the voltage at Vcap can be expressed as: Vcap=Vhb−Vcr, where Vhb is the voltage at the half bridge node 11 and Vcr is the voltage across the resonant capacitor, Cr. In operation, the output, Vout1, at the first output 416 and the output, Vout2, at the second output 418 are fed back to the dual output controller through the compare units as described above with reference to FIGS. 2 and 6A. The common mode control signal, Vcm, and the differential mode control signal, Vdm, are generated by the dual output controller in response to the error signals, error1 and error2. The common mode control signal, Vcm, and the differential mode control signal, Vdm, are provided to the controller of the dual output resonant converter 410 and used to generate switch control signals that are used by the control logic 5 to control the switching of the high-side and low-side switches 6 and 7 such that the output voltage, Vout1 and Vout2, at the first and second outputs, respectively, are controlled independent of each other.

The power converter 300 shown in FIG. 6A can also be configured for Vcr control. When operating according to Vcr control, the dual output controller 320 generates the common mode control signal, Vcr_cm, and the differential mode control signal, Vcr_dm, in response to the error signals, error1 and error2. To generate the common mode control signal, Vcr_cm, and the differential mode control signal, Vcr_dm, the dual output controller is configured with a control parameter matrix of:

$$\begin{pmatrix} k11 & k12 \\ k21 & k22 \end{pmatrix}$$

and the control function can be expressed as:

$$\begin{pmatrix} \text{Vcr\_dm} \\ \text{Vcr\_cm} \end{pmatrix} = \begin{pmatrix} k11 & k12 \\ k21 & k22 \end{pmatrix} \cdot \begin{pmatrix} \text{error1} \\ \text{error2} \end{pmatrix}$$

The control parameter matrix, which was described above, includes the parameters k11, k12, k21, and k22. The common mode term, Vcr_cm, and the differential mode term, Vcr_dm, are generated as:

Vcr_cm=error1·k21+error2·k22; and

Vcr_dm=error1·k11+error2·k12.

Figure 6C:
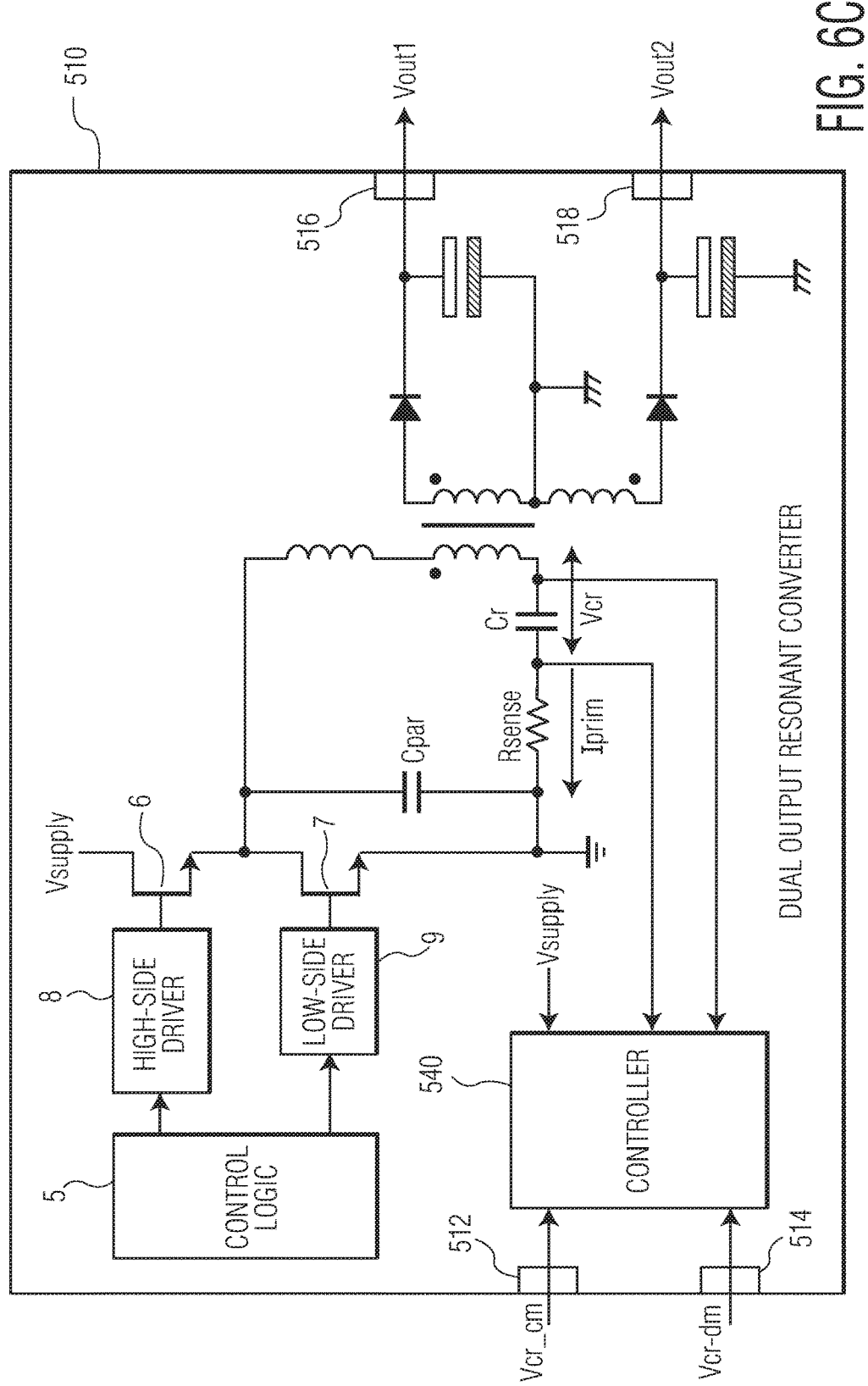
FIG. 6C is a block diagram of an example of a power converter that is configured for Vcr control.

FIG. 6C depicts an embodiment of a dual output resonant converter 510 that is configured for Vcr control. The dual output resonant converter 510 is similar to the dual output resonant converter described with reference to FIG. 1. However, the dual output resonant converter shown in FIG. 6C includes a controller 540 that is configured to generate switch control signals in response to the common mode control signal, Vcr_cm, the differential mode control signal, Vcr_dm, and the voltage across the resonant capacitor, Vcr. As shown in FIG. 6C, the voltage is measured across the resonant capacitor, Cr, and is identified as Vcr. In operation, the output, Vout1, at the first output 516 and the output, Vout2, at the second output 518 are fed back to the dual output controller through the compare units as described above with reference to FIGS. 2 and 6A. The common mode control signal, Vcr_cm, and the differential mode control signal, Vcr_dm, are generated by the dual output controller in response to the error signals, error1 and error2. The common mode control signal, Vcr_cm, and the differential mode control signal, Vcr_dm, are provided to the controller of the dual output resonant converter and used to generate switch control signals that are used by the control logic 5 to control the switching of the high-side and low-side switches 6 and 7 such that the output voltage, Vout1 and Vout2, at the first and second outputs, respectively, are controlled independent of each other.

The dual output controller basically does the inverse action of the dual output resonant converter such that a change in the error1 signal only gives a change in the power delivered to Vout1, while a change in the error 2 signal only gives a change in the power delivered to Vout2. As discussed above, this method of control is called orthogonal control which means that the power in both outputs can be changed independently of each other. Compared to the frequency controlled resonant converter of U.S. Pat. No. 6,822,881 and U.S. Pat. No. 6,829,151B2, the control by state variables gives an almost linear relation between Vdm control input and output power. This makes it easier to get the desired orthogonal control, however the relation between Vcm and power is not linear. Especially when the power in one output is relatively low, transfer from Vcm to power becomes lower and becomes even zero when power in one output goes to zero. This makes it more difficult to get the desired orthogonal control and may even make it impossible to keep both outputs well regulated when one output is at low power.

An embodiment will now be described that allows for regulating both outputs at low power levels by making the transfer from control inputs to power more linear for both control inputs. This embodiment may include the following features: a switch mode power converter with at least two outputs including a regulated system voltage output and a second regulated output, where the second output can be for a higher voltage load with a regulated current; the switch mode power converter may be controlled by state variables, Vcm, Vdm, where the Vcm variable is included in a local feedback loop in order to improve linearity of the transfer from control input to power; and a method of how to limit the control variables if the local feedback loop cannot be kept closed because of a zero gain situation.

Figure 7A:
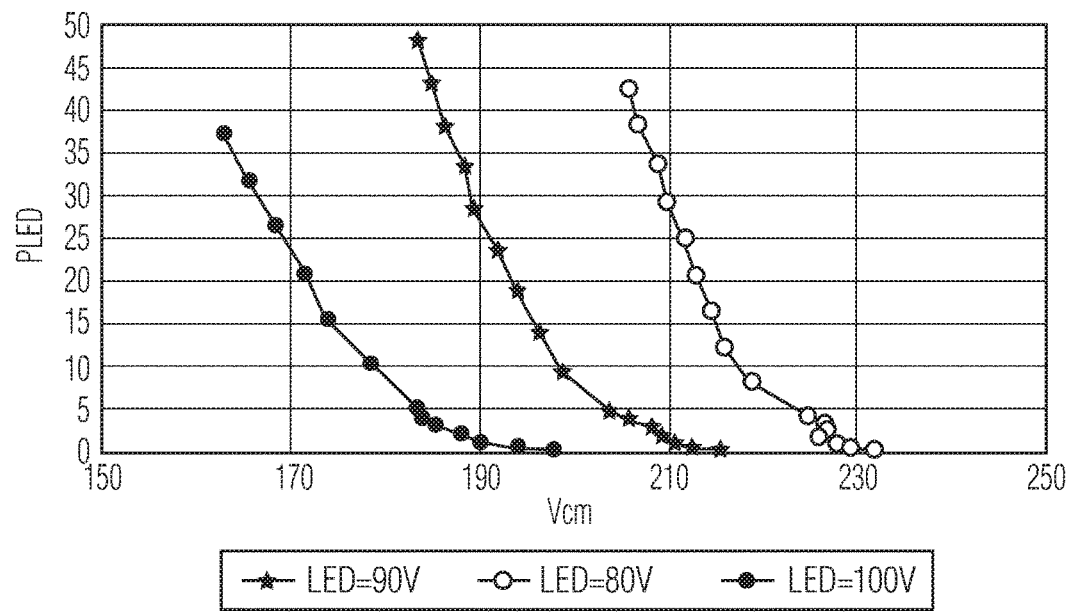
FIGS. 7A and 7B illustrate plots of Vcm and Vdm versus the power supplied to an LED (Pled) string for various LED voltage levels.
Figure 7B:
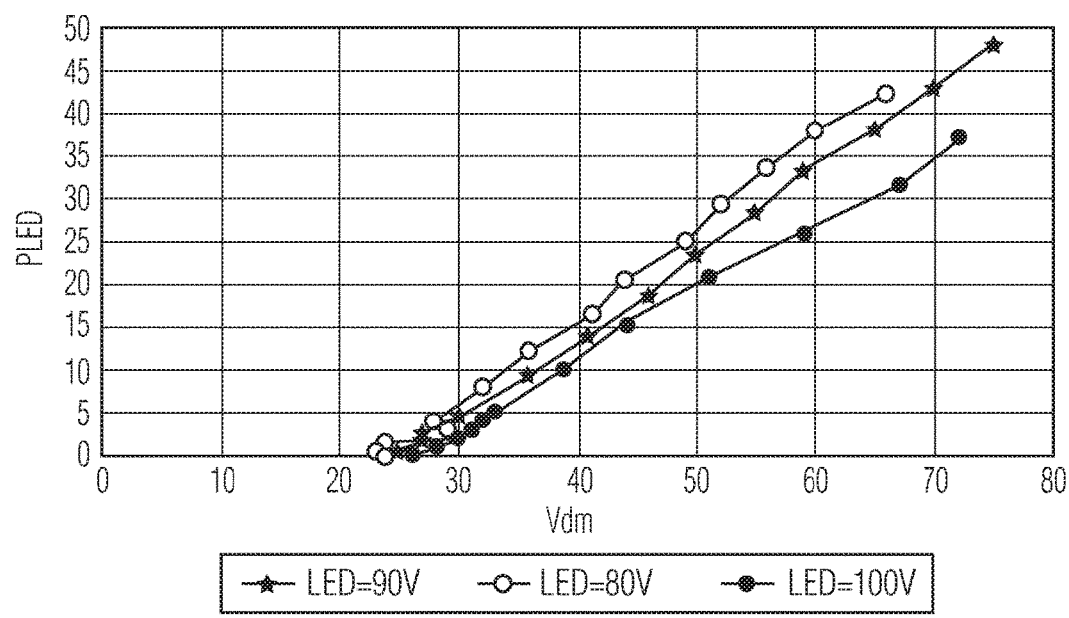

FIGS. 7A and 7B illustrate plots of Vcm and Vdm versus the power supplied to an LED (Pled) string for various LED voltage levels. It is noted that the LED application is just an example used herein and that other applications are possible. More specifically, FIGS. 7A and 7B illustrate a measurement result of a practical dual output resonant converter with a first output having a fixed load at 13V and a second output driving a variable current LED string. Plots are shown for three different LED strings with forward voltage of 80V, 90V and 100V for a given nominal LED current of 200 mA and Vsupply=Vbus=380V. As shown in FIG. 7B, Vdm varies almost linearly versus Pled. On the other hand, as shown in FIG. 7A, Vcm has a nonlinear relationship to Pled, and thus how the power is divided between both outputs has a nonlinear relationship versus Pled.

This nonlinear relationship leads to values for k12 and k22 of the controller matrix that depend on the operating point of the converter. Because the values for k11, k12, k21, and k22 are based upon the derivatives of the Vcm and Vdm curves, if the curve is linear, then these values remain constant throughout the range of operation. If the curve is nonlinear, then the values of k11, k12, k21, and k22 will vary depending on the specific operating point. This makes it difficult or even impossible in practice to maintain the orthogonal control that is required to prevent load steps in output of the dual output resonant converter. For example, load steps in the output voltages of the dual output resonant converter for an LED TV result in visible light variations in the LCD backlight or disturbance in the 12V supply as result of PWM regulation of the LED strings.

Figure 8:
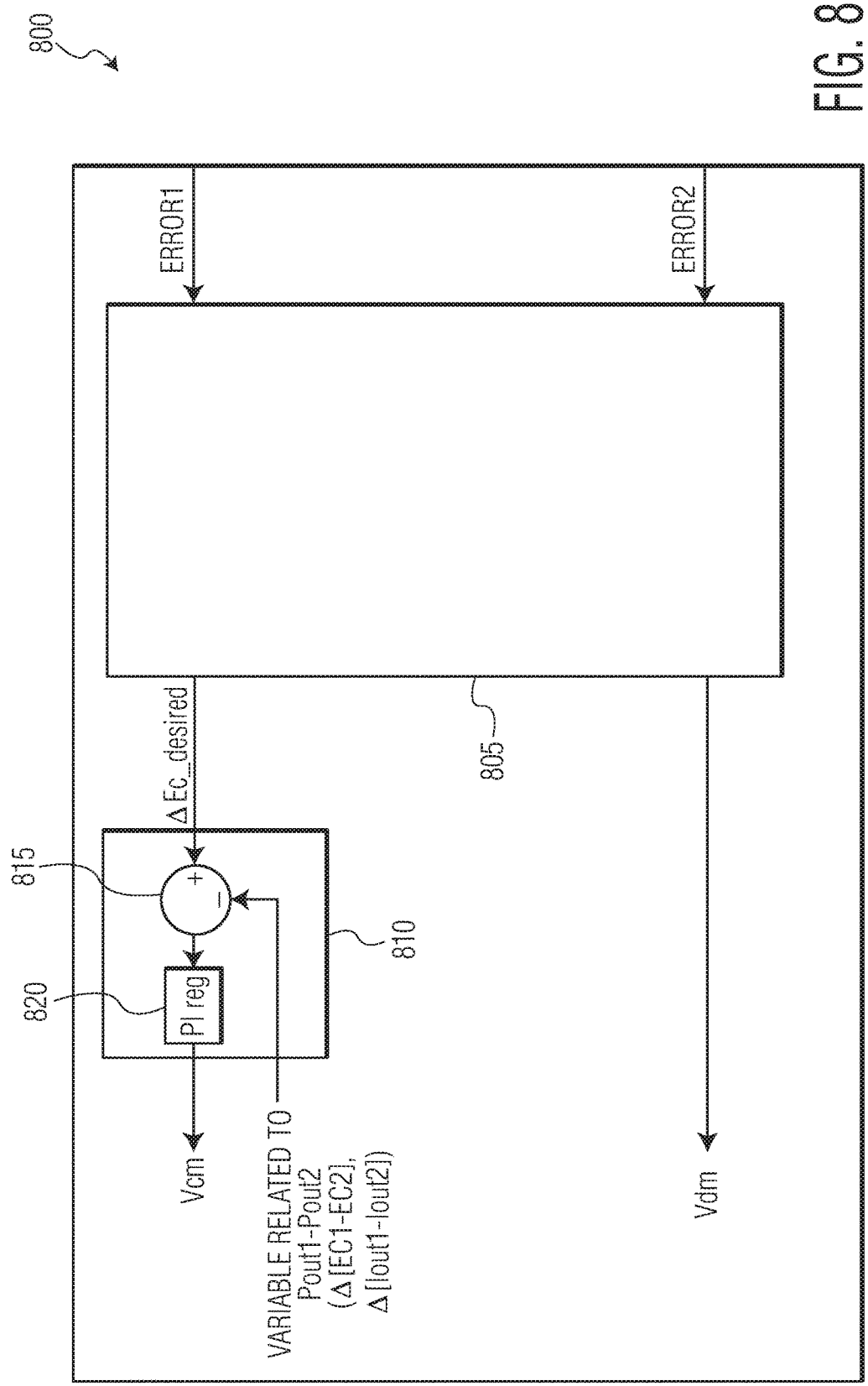
FIG. 8 illustrates embodiment of a dual output controller for a dual output resonant converter that linearizes Vcm.

FIG. 8 illustrates embodiment of a dual output controller for a dual output resonant converter that linearizes Vcm. The dual output controller 800 is an extension of the dual output controller 220 of FIG. 2. The dual output controller 800 includes an error processor 805 that operates like the dual output controller 220 of FIG. 2. The error processor 805 receives error signals that tracks the output of the dual output resonant converter as described above. The error processor 805 computes the value of Vdm as described above. The error processor 805 also computes a value Δ Ec_desired as Δ Ec_desired=error1·k21+error2·k22. Δ Ec_desired is related to the desired difference between the two output powers of the dual outputs of the dual output resonant converter. This power difference may be based upon the output voltages, output currents, or difference in converted energy during each half-cycle; accordingly, Δ Ec_desired may be based upon any of these measures.

The dual output controller 800 also includes a local feedback loop 810 that adapts Vcm such that the variable related to the difference in output power based upon Δ Ec_desired. The local feedback loop includes an adder 815 that takes the difference between Δ Ec_desired and the measured difference between the two output powers of the dual outputs. This difference is then fed into a regulator 820 that produces a value for Vcm that is then used by the dual output resonant converter as described above. The regulator 810 is shown as a proportional integration (PI) regulator, but other types of regulators may be used as well, such as for example, proportional integrators, differentiation regulators, etc.

This feedback loop results in Δ Ec_desired having linear relationship with respect to Pled as long as the loop is closed. This results in a new dual output controller 800 with inputs Vdm and □ Ec_desired resulting in orthogonal control for the total system for every operating point without the need to vary k11, k21, k12, k22 based upon the specific operating point.

Figure 9:
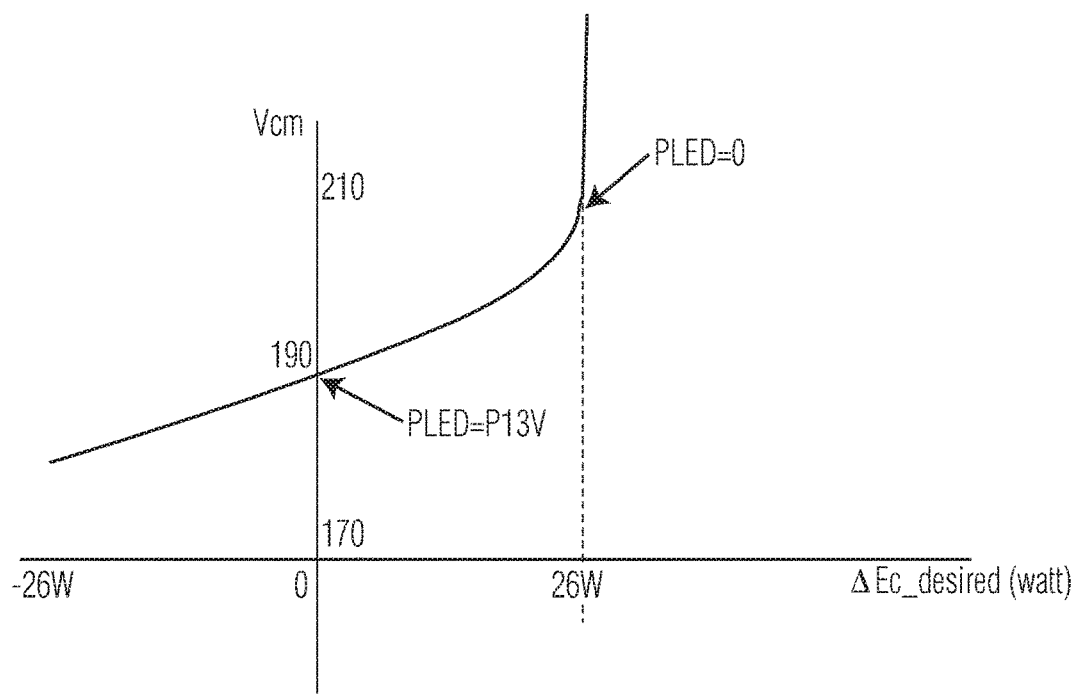
FIG. 9 illustrates the relationship between □ Ec_desired and Vcm as result of the feedback loop.

Now it will be shown that this feedback loop results in a linear relationship between Δ Ec_desired and Pled as desired. First assume that □ Ec_desired is expressed as the difference in power between the two outputs, then assuming the 13V output is loaded with 13V, 2A=26 watts, then □ Ec_desired=0, means power in the LED output also equals 26 watts. Also using the curve for an led voltage of 90V, then Pled=0 corresponds to Vcm=215V, which is also the point above which Vcm can no longer define the power, because all power flows in the 13V output. This leads to a new curve defining the relationship between □ Ec_desired and Vcm as result of the feedback loop 810. FIG. 9 illustrates the relationship between □ Ec_desired and Vcm as result of the feedback loop. FIG. 9 indicates the vertical asymptotic behavior for Vcm=f(□ Ec_desired) when led power goes to zero. This then leads to FIG. 10 which illustrates the linear relationship between □ Ec_desired and Pled. This linear relationship means that Vcm will have the same original nonlinear relationship with Pled, because the path from Vcm to the resonant controller did not change by adding the local feedback, however the feedback loop 810 drives the error signal that is the input for the PI regulator 820, therefore the regulator adapts Vcm such that the desired behavior of curve below occurs until □ Ec_desired and □ Ec=poutLED−Pout13V) are equal and the error signal goes to 0.

Figure 11:
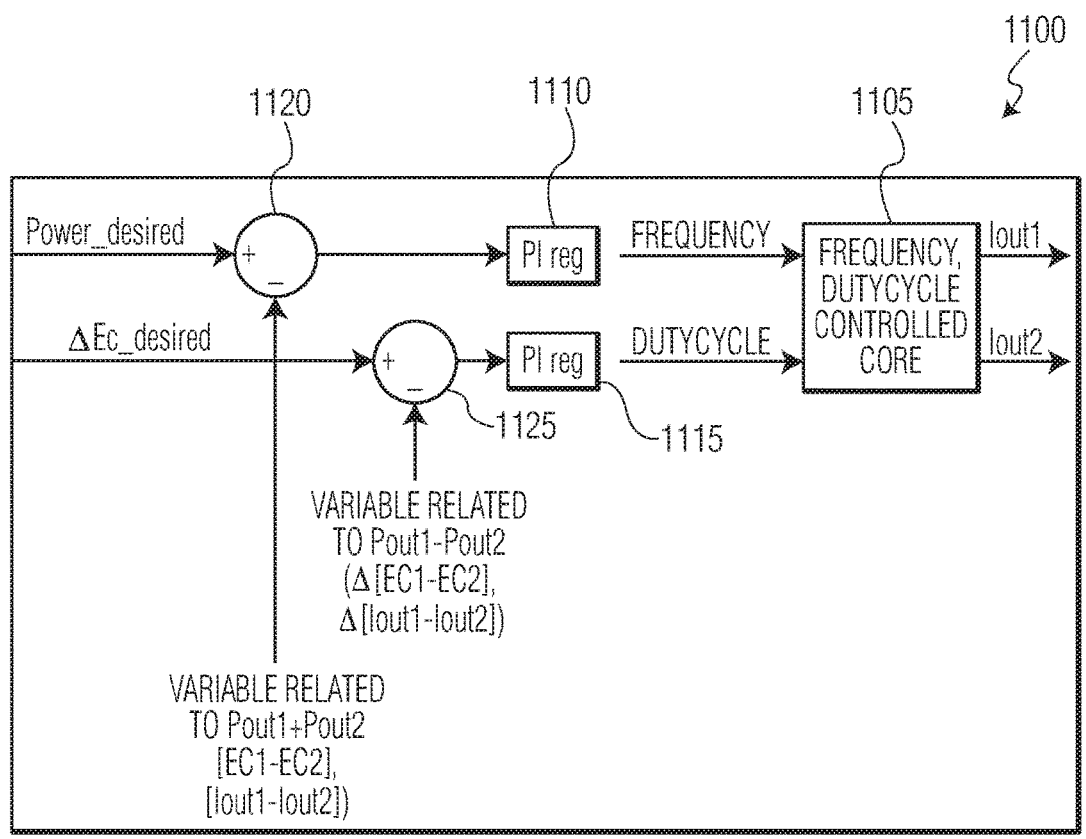
FIG. 11 illustrates dual output resonant converter 1100 the using feedback loops to linearize the duty cycle and frequency control parameters.

In a dual output resonant converter that used duty cycle and frequency control, the output powers have a nonlinear relationship to the duty cycle and frequency control parameters. As a result, the feedback loop 810 of FIG. 8 may also be applied to the duty cycle and frequency control parameters. FIG. 11 illustrates dual output resonant converter 1100 the using feedback loops to linearize the duty cycle and frequency control parameters. The dual resonant converter 1100 includes a frequency and duty cycle controlled core 1105, PI regulators 1110 and 1115, and adders 1120 and 1125. The first feedback loop includes adder 1120 and PI regulator 1110 and receives an input of the total power desired and a measure of the total power produced. The first feedback loop drives the frequency control parameter to a value that leads to the total power desired. Likewise, the second feedback loop includes adder 1125 and PI regulator 1120 and receives an input of the difference in power desired and a measure of the difference in power produced. The second feedback loop drives the duty cycle control parameter to a value that leads to the difference in output desired. As a result, the two new control inputs Power_desired and □ Ec_desired now have a linear relationship with the output powers while the nonlinear relation between the original control parameters frequency, duty cycle are still nonlinear with power.

Figure 10:
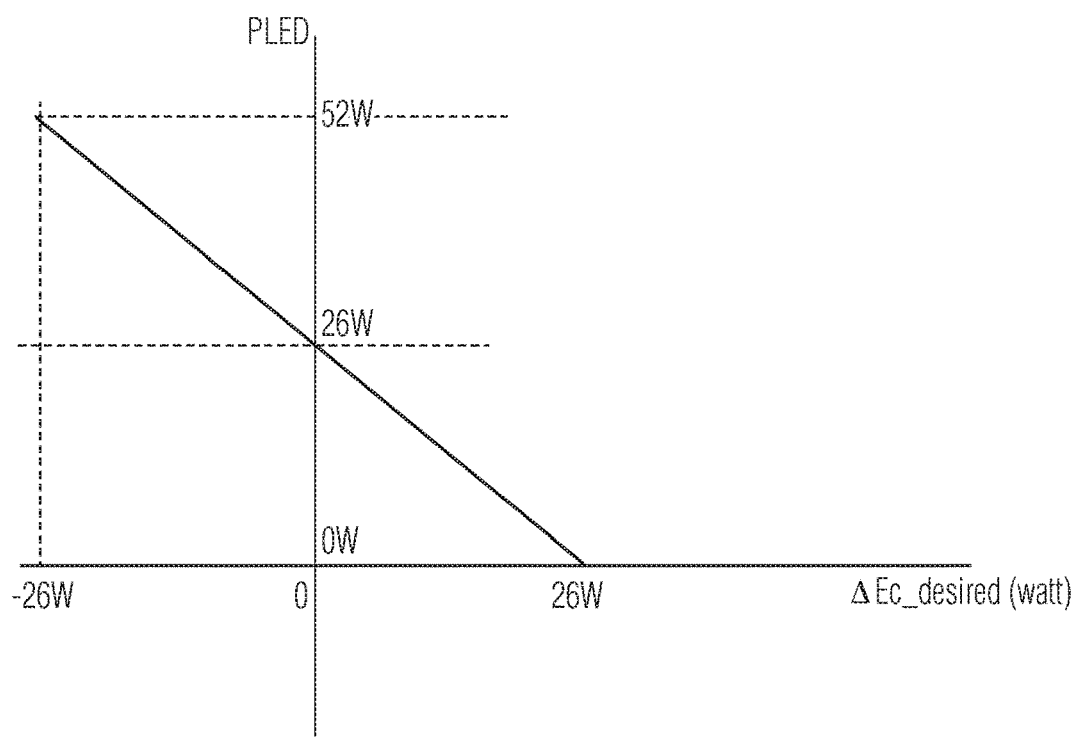
FIG. 10 illustrates the linear relationship between □ Ec_desired and Pled.

The curves of FIGS. 9 and 10 further show that at the edges where one of the output powers go to zero, the feedback loop 810 cannot be kept closed anymore, because even for an infinite amount of variation of Vcm, zero variation of □ Ec still occurs, i.e., vertical asymptotic behavior. From FIG. 7A it can be seen that for values of Vcm above a certain level the gain from Vcm to Pout1-Pout2 becomes zero. At that situation all power flows to one output. This also means that the feedback loop 810 cannot be kept closed, because a change in Vcm will not have any effect anymore on the output currents. The result will be that Pout1 or Pout2 (depending on which of the two is zero) is only controlled by the Vdm signal; however without additional measures, Vcm will continue to adapt while entering a dead zone.

As it is possible to control one output by one control signal, this situation can be used in practice when it is possible to keep the open feedback loop in a well-defined state as close as possible to the point where the influence of Vcm on output power is lost. In this way rapid recovery is possible without too much transient effects to the closed loop situation when the zero power at one output situation is left.

An embodiment will now be described where the Vcm signal is clamped at a maximum or minimum value when it is detected that the output power at one power output has become zero. In this situation using a clamped Vcm, it is possible to keep the loaded output regulated.

Clamping can for example be done at a predetermined level just outside the normal operating region. It is also possible to do the clamping based on information related to the output current. The embodiments for clamping Vcm may use, for example, the following information: 1) actual sensing of the output current and limiting Vcm when the output current gets close to zero; 2) sensing of the voltage at an auxiliary winding and detecting if the voltages gets larger than the reflected output voltage during a certain time interval during a half-cycle; and 3) checking if continuous conduction mode (CCM) operation occurs. This may be accomplished by a power detector that detects when the power at one of the dual outputs goes to zero, and then a limit detector that limits with value of Vcm when the power detector indicates that the power at one of the dual outputs has gone to zero.

Figure 12:
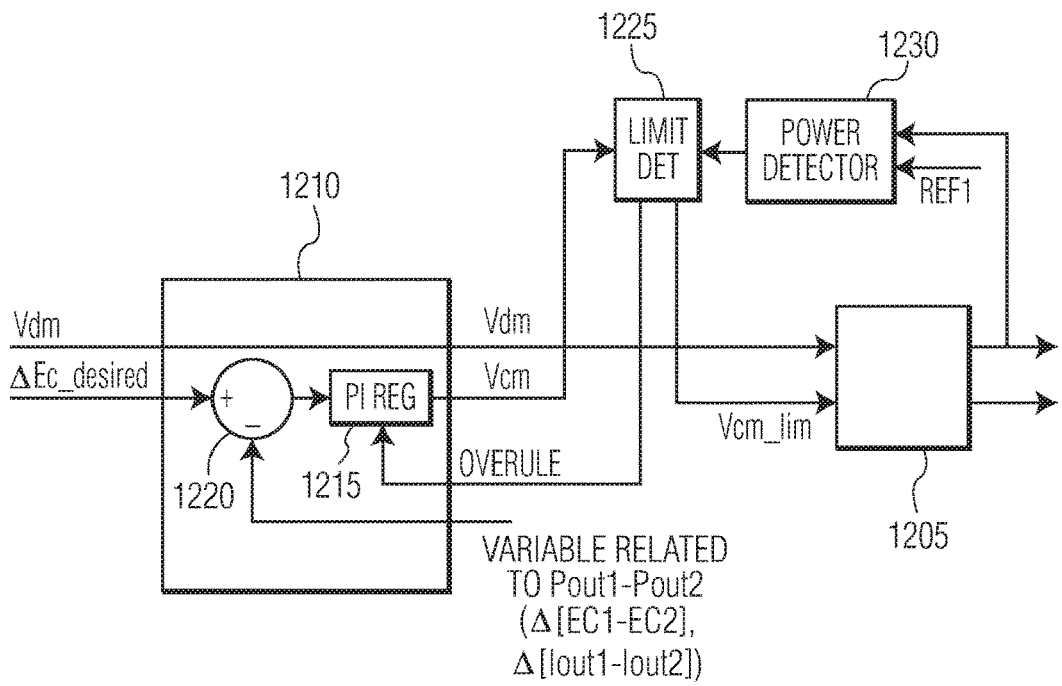
FIG. 12 illustrates a block diagram of a first embodiment for clamping Vcm.

FIG. 12 illustrates a block diagram of a first embodiment for clamping Vcm. In this embodiment, the output current is sensed and compared with a threshold in order to generate an error signal that overrules the standard feedback loop, for example by taking the maximum of the standard Vcm signal and the error signal to generate a signal Vcm_lim that is used by the dual output resonant converter instead of the normal Vcm signal. The block diagram of FIG. 12 includes a feedback loop 1210 the same as shown in FIG. 8 and that operates as described in FIG. 8 and that includes a PI regulator 1215 and adder 1220. The dual output resonant converter 1205 is also shown. A limit detector 1225 and a power detector 1230 are also included. The power detector 1230 is a circuit that receives a measurement of the output power of one of the outputs of dual output resonant converter 1205. This measurement may be current, voltage, or power depending on the specific implementation. The power detector 1230 is a circuit that also receives a reference value that corresponds to a nearly zero power output of the one output. The power detector 1230 produces a value indicating that the output power is nearly zero. The limit detector 1225 outputs a Vcm_lim signal. This Vcm_lim signal corresponds to Vcm during normal operation, but when the output of the power detector 1230 indicates that the output power is within a threshold value of zero power, then the limit detector 1225 outputs a Vcm_lim value that is a fixed maximum value for Vcm to thus clamp the value of Vcm_lim. The limit detector 1225 also outputs an over rule signal that is sent to the PI regulator 1215 that stops the operation of the PI regulator 1215 until the output power increases above the threshold value again. In this case, further integration of Vcm and therefore entering a dead zone is prevented. Preventing such a deadzone is preferred in order to prevent long dead times when the output power increases above the threshold value again FIG. 12 shows the basic block diagram for one power output only. For the other power output a similar circuit would be used, but the limit detector would instead detect a minimum Vcm value as the Vcm term has the opposite effect on the power in each power output.

Figure 13:
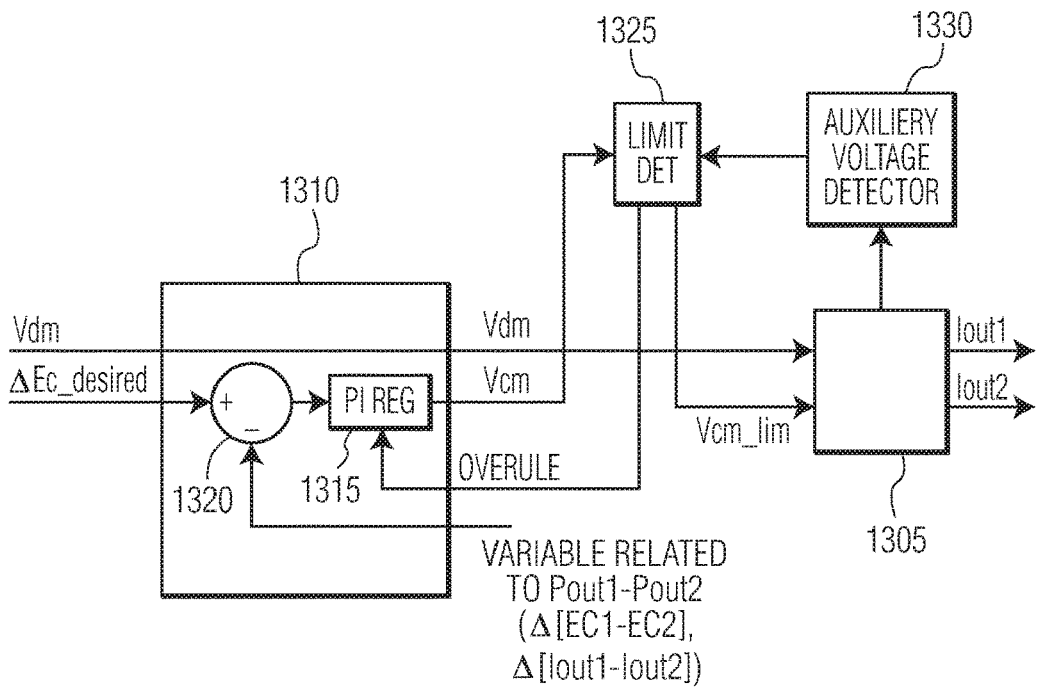
FIG. 13 illustrates a block diagram of a second embodiment for clamping Vcm.

FIG. 13 illustrates a block diagram of a second embodiment for clamping Vcm. In this embodiment, the voltage at an auxiliary winding that is coupled to the secondary winding is monitored in order to generate an error signal for limiting the Vcm signal. The block diagram of FIG. 13 includes a feedback loop 1310 the same as shown in FIG. 8 and that operates as described in FIG. 8 and that includes a PI regulator 1315 and adder 1320. The dual output resonant converter 1305 is also shown. A limit detector 1325 and an auxiliary voltage detector 1330 are also included.

The auxiliary coil is wrapped around the common core and is coupled to the secondary winding. Accordingly, a voltage and current is induced on the auxiliary coil during operation of the dual output resonant converter 1305. This auxiliary voltage may be monitored in order to determine when the power at one output of the dual output resonant converter 1305 goes to zero.

It can be shown that the voltage across the aux winding reaches a fixed value during an interval that the output current flows. This is the reflected output voltage that is visible at the auxiliary winding. Outside that interval, the auxiliary voltage is lower, because the secondary diode is not conducting then. The auxiliary voltage is then equal to the voltage across the primary side of the transformer. So based on this observation, the interval where no secondary current flows is related to the auxiliary voltage during this interval being lower than the auxiliary voltage during the interval where output current flows. This difference may be used to determine when there is no current flowing to one of the outputs.

While FIGS. 12 and 13 both illustrate embodiments using a feedback loop, such a feedback loop is not necessary, and the limit detector may be applied to systems that do not use this feedback loop.

Figure 14:
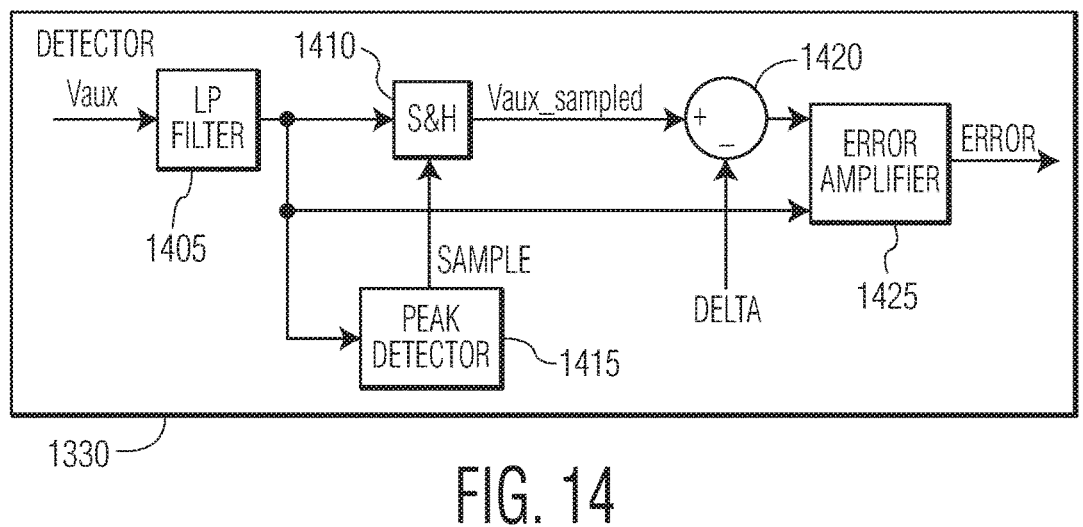
FIG. 14 illustrates a block diagram of the aux voltage detector.

The auxiliary voltage detector 1330 is a circuit that receives the auxiliary voltage value from the auxiliary coil and that acts as a power detector. FIG. 14 illustrates a block diagram of the auxiliary voltage detector. The auxiliary voltage detector includes a low pass (LP) filter 1405, a sample and hold (S&H) circuit 1410, a peak detector 1415, an adder 1420, and an error amplifier 1425. The LP filter 1405 receives the auxiliary coil voltage Vaux and filters out any high frequency components from the auxiliary voltage signal. The output of the LP filter 1405 is fed into the peak detector 1415, the sample and hold circuit 1410, and the error amplifier 1425. The peak detector 1415 monitors the value of the filtered auxiliary coil voltage Vaux to detect when a peak value is reached, and when such a value is reached, the peak detector 1415 sends a sample signal to the sample and hold circuit 1410 which samples the filtered auxiliary coil voltage Vaux. This is done during a first cycle where power is being transferred. The sampled auxiliary coil voltage Vaux_sampled is then input to the adder 1420. The adder 1420 subtracts a delta value from the Vaux_sampled value, and the results is fed into the error amplifier 1425. The output of the adder 1420 is a value that is used to determine when the filtered auxiliary coil voltage Vaux falls below a certain value relative to the maximum Vaux value that indicates that the output power being monitored is approaching zero. In a next cycle where the output power may approach zero. The error amplifier 1425 uses the output of the adder and the filtered auxiliary coil voltage Vaux to generate an error signal. Due to the sampled Vaux at the peak value with a small delta subtracted, the error amplifier input from 1420 defines a slicing level with respect to the other amplifier input that defines an interval during next switching cycle where the filtered Vaux is above this slicing level for a short interval around the top of Vaux. The duration of this interval therefore defines how close to zero the output current is and sets the output of the error amplifier. Therefore the error output is a duty cycle based on the fact that Vaux is above or below the sampled value minus delta can be used to limit the Vcm signal. The error signal output from the error amplifier 1425 is therefore input to the limit detector 1325.

The limit detector 1325 outputs a Vcm_lim signal. This Vcm_lim signal corresponds to Vcm during normal operation, but when the output of the auxiliary voltage detector 1330 indicates that the output power is within a threshold value of zero power, then the limit detector 1325 outputs a Vcm_lim value that is a fixed maximum value for Vcm to thus clamp the value of Vcm_lim. The limit detector 1325 also outputs an overrule signal that is sent to the PI regulator 1315 that stops the operation of the PI regulator 1315 until the output power increases above the threshold value again. In this case further integration of Vcm ends, therefore entering a dead zone is prevented similar to the embodiment of FIG. 12.

The more the output current reduces to zero, the smaller the interval where Vaux gets larger than the sampled Vaux minus delta becomes, so therefore, the duty cycle becomes smaller.

Therefore the duty cycle of the interval related to the half-cycle can then be used as error signal for limiting Vcm.

Also in this embodiment relation between Vcm and sensed signal is lost at no load, because then the peak value of the aux voltage is not the output voltage anymore when the secondary diode does not conduct. So also here signal cannot directly be used to regulate to no load, because from a no load situation it is not possible to detect the actual distance to no load point as for every further adaption of Vcm into no load region, Vaux peak value is not related to Vout anymore, so it is not possible to relate the duty cycle at the erroramp output to this distance.

For the other power output a similar error signal can be generated but with opposite polarity similar to the first embodiment.

It is noted that the direct use of output current has a limitation that no information is available about the distance of a given Vcm to the point of no load. Therefore, regulation all the way to zero load is not possible.

A third embodiment of Vcm clamping using CCM monitoring will now be described. This third embodiment utilizes the feature that the half cycle with largest output current will enter CCM when the asymmetry is larger than a certain maximum.

Figure 15:
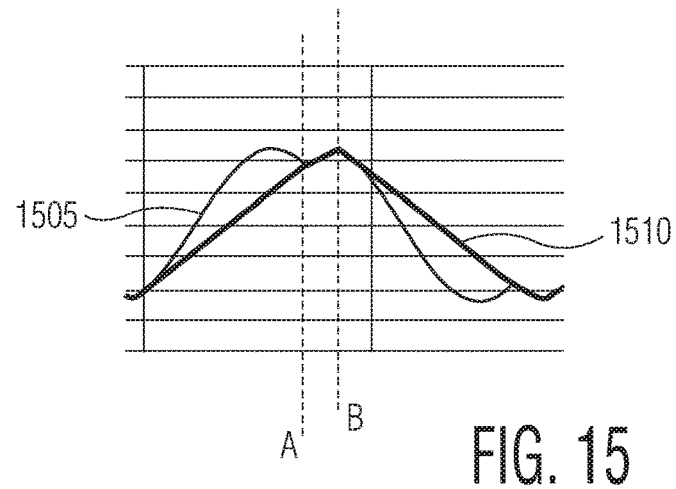
FIG. 15 illustrates a plot of current on the primary coil and in the core in the situation when both power outputs are loaded.

FIG. 15 illustrates a plot of current on the primary coil and magnetizing current component as result of magnetizing the core in the situation when both power outputs are loaded. The secondary current is the difference between the primary current and the current in the core. Accordingly, when the primary current and the core current are equal, the secondary current is zero. When point A where the secondary current becomes zero is before the end of the half-cycle B, the half-cycle is in discontinuous mode (DCM).

Figure 16:
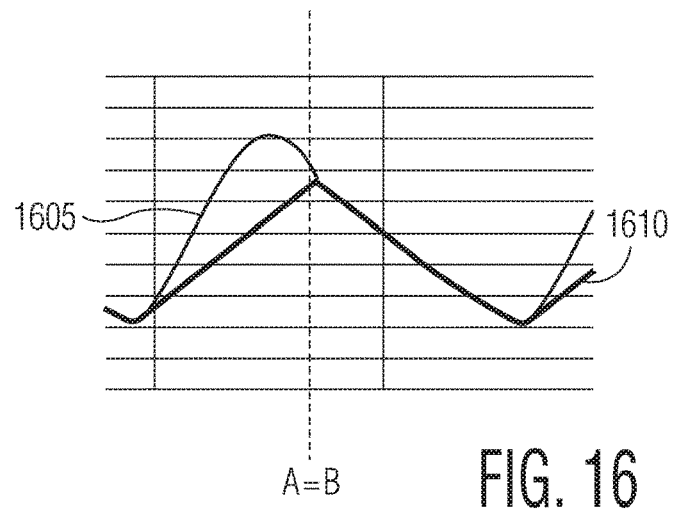
FIG. 16 illustrates a plot of current on the primary coil and in the core in the situation when one output has gone to zero output power.

FIG. 16 illustrates a plot of current on the primary coil and in the core in the situation when one output has gone to zero output power. In FIG. 16, point A where the secondary current becomes zero is at the end of the half-cycle B, so the half-cycle is in CCM. Also the depth of CCM (i.e., how large the secondary current is at the end of the secondary stroke) increases when asymmetry (which is set by Vcm term) is further increased.

When the resonant tank of the dual output resonant converter is dimensioned such that CCM operation occurs only when the output current during the other half-cycle has already become zero, then the point where CCM occurs (and also the CCM depth) can be used to limit the Vcm term. This dimensioning can be realized by choosing the proper reflected output voltage (turns ratio) in combination with the required maximum supply voltage of the LLC converter and minimum output voltage. It is noted that CCM operation first occurs at maximum ratio between supply voltage and output voltage.

Detection of CCM operation is possible by sensing the output current at the end of the secondary stroke. As an alternative the aux voltage at an auxiliary coil coupled to the secondary as described above may be sensed and checked to determine if the aux voltage decreases before (DCM) or after the end of the secondary stroke (CCM). The depth of CCM is related to the time it takes after the end of the half-cycle before the aux voltage reacts. By measuring the time difference between end of the half-cycle and moment that aux voltage starts to react, an error signal can be created that is used to determine with the output power goes to zero and to then clamp the value of Vcm.

Simulations can be used to show the behavior of Vaux and Vhb, which is the voltage of the switching node, relative to when CCM occurs. In one example of a simulation result of a dual output resonant converter with a 13V low voltage output and a 90V LED string output voltage based on the controller of FIG. 8, the current in the Led output is reduced in steps. In this simulation, the Vaux crosses 0 V 75 ns after the Vhb slope starts. In this case during the half-cycle DCM occurs.

In another simulation situation CCM occurs with a delay of 200 ns between Vhb slope starts and Vaux crosses 0V. Another simulation situation illustrates the situation where CCM occurs with significant output current at the end of the secondary stroke resulting in a delay of 265 ns between Vhb slope starts and Vaux crosses 0V. These characteristics may be used to determine when the output power goes to zero.

Using this CCM detection method of determining time differences between when Vaux crosses 0V and when a slope in Vhb starts allows for the regulation of the system to no load because at no load, the relation between Vcm and time difference is still defined.

Figure 17:
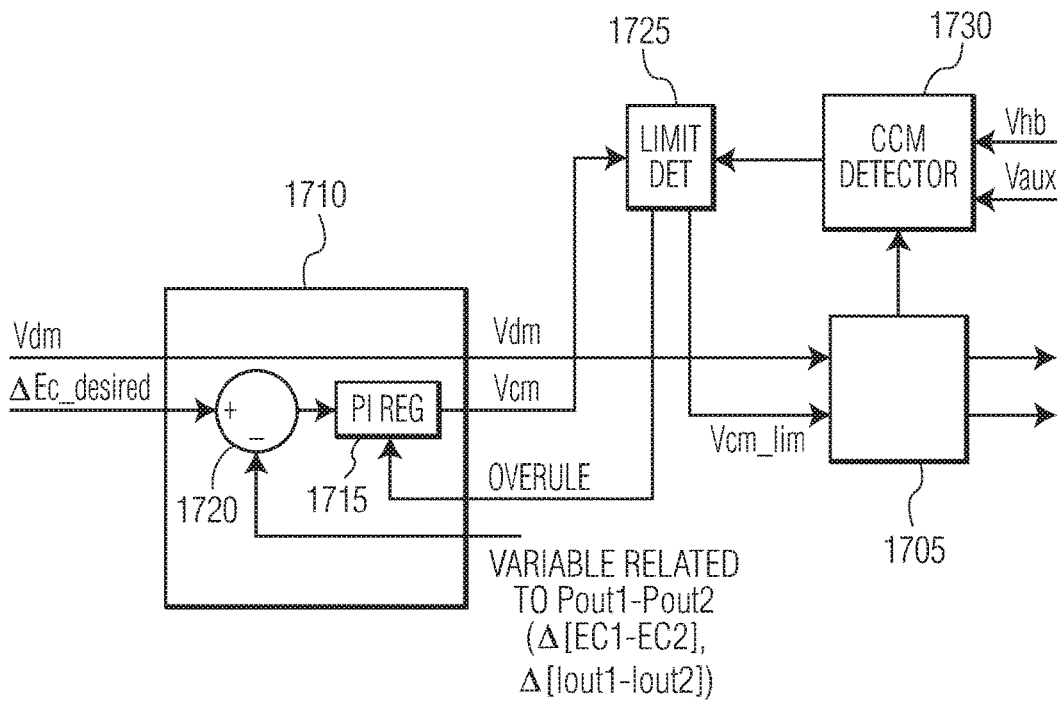
FIG. 17 illustrates a block diagram of a third embodiment for clamping Vcm.

FIG. 17 illustrates a block diagram of a third embodiment for clamping Vcm. In this embodiment, the voltage at an auxiliary winding being coupled to the secondary winding and the voltage of the switching node Vhb (see 11 in FIG. 1), are monitored in order to generate an error signal for limiting the Vcm signal. The block diagram of FIG. 17 includes a feedback loop 1710 the same as shown in FIG. 8 and that operates as described in FIG. 8 and that includes a PI regulator 1715 and adder 1720. The dual output resonant converter 1705 is also shown. A limit detector 1725 and a CCM detector 1730 are also included.

Figure 18:
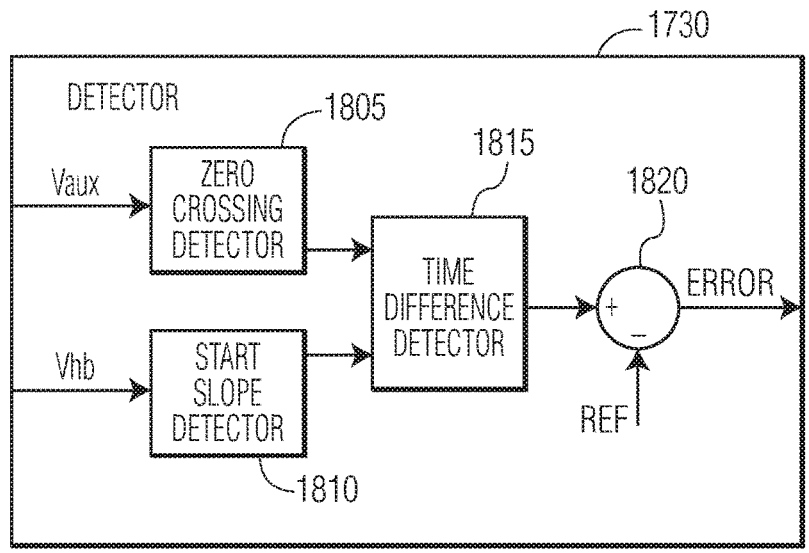
FIG. 18 illustrates a block diagram of the CCM detector.

The CCM detector 1730 is a circuit that receives the auxiliary voltage value Vaux from the auxiliary coil and the voltage at the switching node Vhb and that acts as a power detector. FIG. 18 illustrates a block diagram of the CCM detector. The CCM detector 1730 includes a zero crossing detector 1805, a start slope detector 1810, a time difference detector 1815, and an adder 1820. The zero crossing detector 1805 monitors the Vaux input voltage and outputs a time value when the Vaux input voltage crosses 0V. The start slope detector 1810 monitors the Vhb input voltage and outputs a time value when the Vhb voltages starts to have a slope. The time difference detector 1815 computes a time difference between the when Vaux crosses 0V and Vhb starts to exhibit a slope. The adder 1820 subtracts a reference value from the computed time difference from the time difference detector 1815 to produce an error signal. The reference value is based upon an expected time difference that shows that CCM operation has started. The error signal output from the CCM detector 1730 is then input to the limit detector 1725.

The limit detector 1725 outputs a Vcm_lim signal. This Vcm_lim signal corresponds to Vcm during normal operation, but when the output of the CCM detector 1730 indicates that the output power is within a threshold value of zero power, then the limit detector 1725 outputs a Vcm_lim value that is a fixed maximum value for Vcm to thus clamp the value of Vcm_lim. The limit detector 1725 also outputs an over rule signal that is sent to the PI regulator 1715 that stops the operation of the PI regulator 1715 until the output power increases above the threshold value again. In this case further integration of Vcm ends, therefore entering a dead zone is prevented similar to the embodiment of FIG. 12.

As described above, the three clamping embodiments may also be used with a converter that is controlled by duty cycle and frequency according to FIG. 11. In this case the duty cycle mainly determines how the power is divided between the two outputs similar to the Vcm term.

Figure 19:
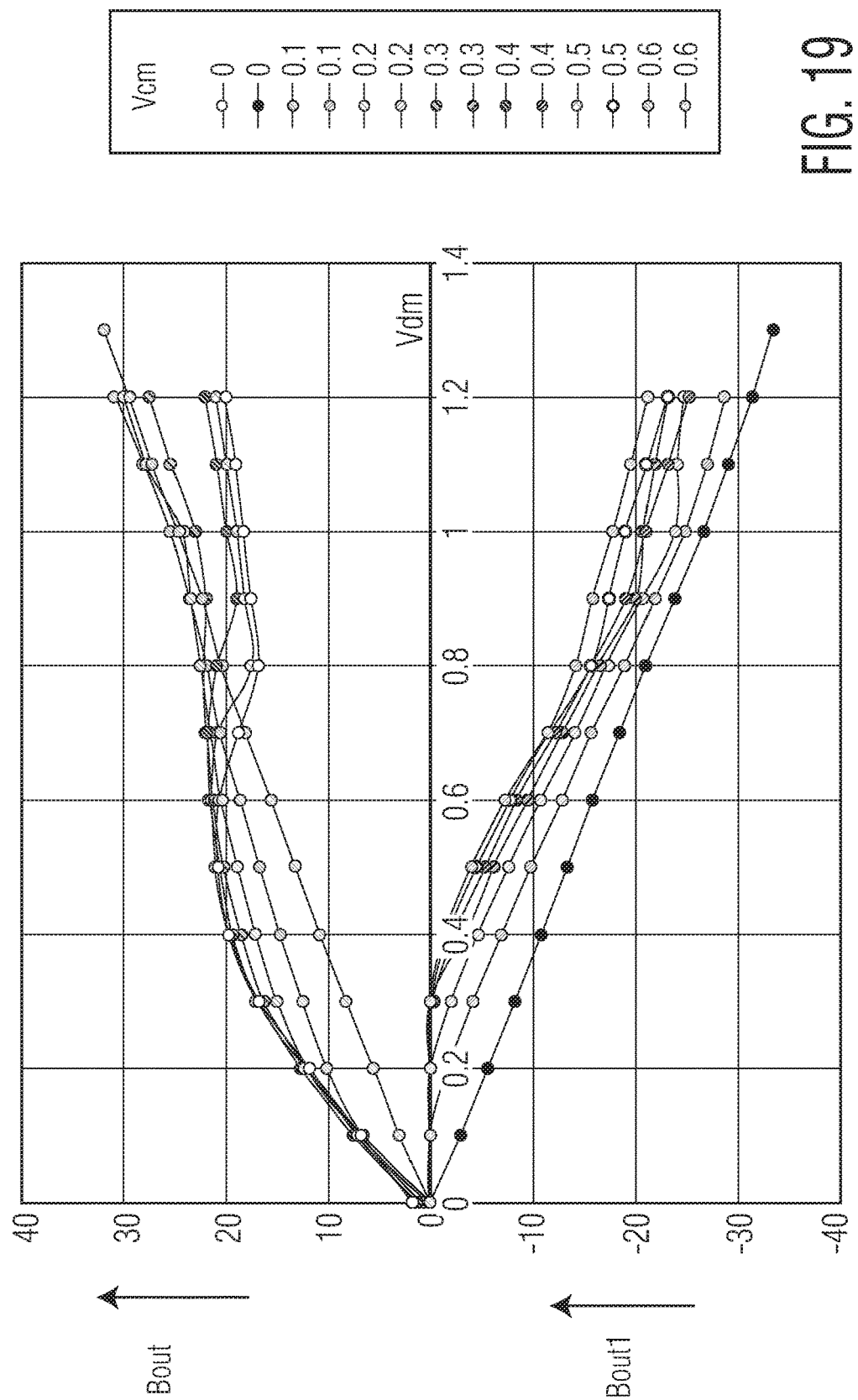
FIG. 19 illustrates a simulation result of a dual output resonant converter being controlled by Vdm and Vcm signals.

In certain instances it may be difficult to control a dual output resonant converter to ensure a full output power range for each of the outputs. FIG. 19 illustrates a simulation result of a dual output resonant converter being controlled by Vdm and Vcm signals as described above. The output voltages are such that at Vcm=0, equal powers occur at both outputs. For simplicity, the turns ratio for both outputs are the same such that both output currents have the same weight factor with respect to output power.

Figure 20:
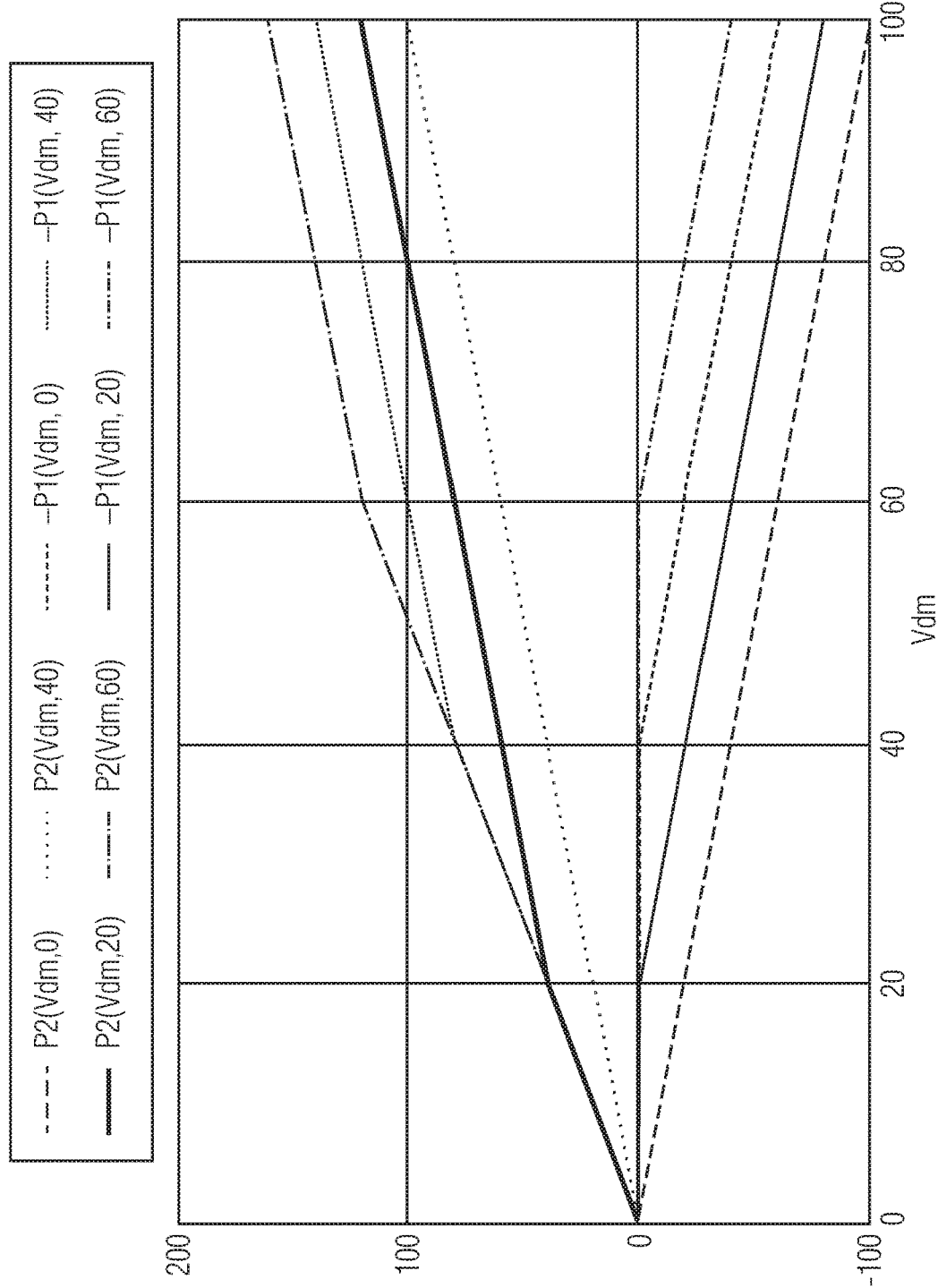
FIG. 20 illustrates a simplified model of the plot of FIG. 19.

From FIG. 19 it can be seen that for Vcm=0 both output powers are equal and proportional to Vdm. For Vcm>0, Iout2 is increased while Iout1 is reduced, basically shifting power from one output to the other especially for relatively small powers, for example, Vdm<approx. 0.3. This process of shifting power stops rather abruptly when Iout1 becomes close to 0, while at larger values for Vdm, the process of shifting power is smoother. For Vdm>0.6 in this example, undesired effects occur, such as the switching frequency starting to change significantly and other effects that require detailed understanding of the resonant tank behavior due to large resonance and therefore is not discussed here. Therefore, the dual output resonant converter may therefore be designed to operate preferably at Vdm below a certain maximum of 0.3-0.6 referring to the scaling factor used in FIG. 19. In this operating range, the behavior of the dual output resonant converter is such that symmetry is mainly set by Vcm, while total power is mainly set by Vdm. Based on a simplified model that assumes an abrupt change over of power and certain dimensioning of the resonant tank, power as function of both Vcm and Vdm in each output can be modelled as given in FIG. 20. FIG. 20 illustrates a simplified model of the plot of FIG. 19. Although this model is only a very simple approximation of the actual behavior, it can be used to get a better understanding of the main problems of providing a full range of power control for each output and how to overcome those problems.

As described above, the required controller should have the inverse behavior of the converter, which can in general be written as:

$$Vcm = error1 \cdot k21 + error2 \cdot k22; \text{ and}$$

$$Vdm = error1 \cdot k11 + error2 \cdot k12.$$

Figure 21:
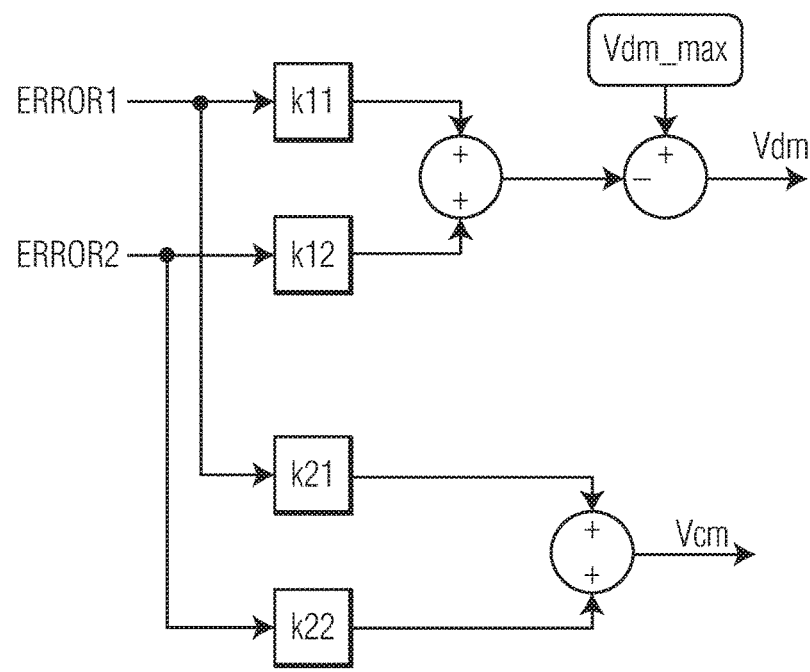
FIG. 21 illustrates a block diagram of a dual output controller showing that when the measured currents are zero so that a value of Vdm_max is output from the controller.

These equations are small signal equations, so a change in error signals causes a change in Vdm and Vcm. For a practical controller being driven by a current from two opto-couplers, the maximum power occurs when both opto-coupler currents are zero. In this case, the maximum value of Vdm (Vdm_max) occurs. FIG. 21 illustrates a block diagram of a dual output controller showing that when the measured error signals are zero so that a value of Vdm_max is output from the controller. As the error signals grow, the value of Vdm decreases from Vdm_max because the power is less than the maximum value.

For the specific case where symmetrical behavior occurs for both outputs (i.e., the same reflected output voltage, same coupling to primary for both secondary windings, and both outputs operating at about the same output power), symmetry or the difference between the output powers is mainly set by Vcm, while the total power is mainly set by Vdm. This means that that k11 and k12 are equal, while k21 and k22 have the same magnitude but opposite signs. This situation is valid for both output powers larger than zero and small to moderate power levels.

Figure 22A:
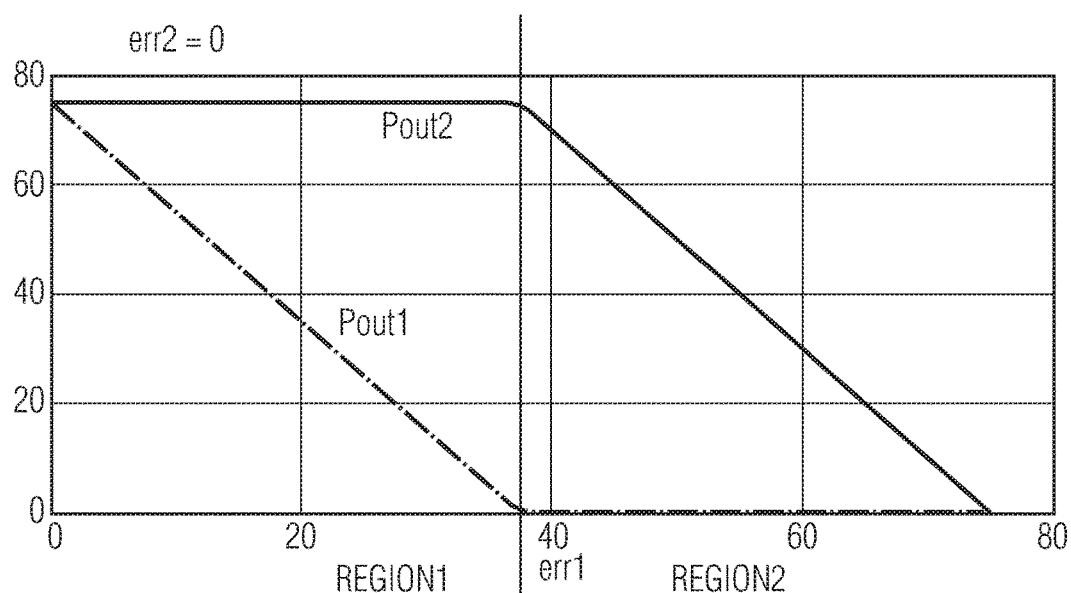
FIG. 22A illustrates the situation where Vcm is no longer capable of setting the division of power between both outputs.

For the region where Vcm causes one of the output powers to go to zero, a controller according to the equations for Vcm and Vdm above with k11 and k12 equal and k21 and k22 having the same magnitude but opposite signs can lead to problems, because both error signals can reduce the Vdm signal setting the total power, while Vcm is no longer capable of setting the division of power between both outputs. FIG. 22A illustrates the situation where Vcm is no longer capable of setting the division of power between both outputs.

Pout1 is the power in the first output and Pout2 is the power in the second output. In region 1 2205, power flows to both outputs and as the controller is set to the optimum parameters k11=k12 and k21=−k22, and Pout1 is set by error signal error1, while error1 does not have an effect on Pout2. The reason that Pout2 can be kept constant is that error1 reduces Vdm while error1 also adapts Vcm in the proper ratio such that the power reduction of Pout2 due to Vdm's reduction is compensated by shifting power from Pout1 to Pout2 by changing the Vcm term.

In region 2 2210, however, Vcm loses its influence as Pout1 reaches 0. The result is that only the Vdm term can change the power, so the two output powers are then set by only one variable. Due to k11=k12 the error1 signal still continues to reduce the total power by reducing the Vdm term, while the compensating effect of k21 in combination with Vcm, shifting power from Pout1 to Pout2 is lost, as there is no power left to shift from the first output to the second output as Pout1 is already zero. The result is that orthogonal control is lost because Pout2 is also reduced by error1, which is undesired.

An embodiment that overcomes this problem of power loss in one output and the loss of orthogonal control by limiting the reduction of the Vdm term by each error signal to a value of, for example, half of the maximum value, such that power in the other output can be kept under control by the other error signal is described below.

As before, an embodiment of a dual mode resonant converter with at least two outputs including a regulated system voltage output and a second regulated output, where the second output can be a LED string with regulated current will be used as an example. The dual mode resonant converter is controlled by state variables Vcm and Vdm, where the Vdm variable is limited to a minimum value by each error signal such that the other error signal is capable of increasing the power to the required value. In order to get a better understanding of the details of this embodiment, first a more detailed analysis of the problem is described.

Figure 22B:
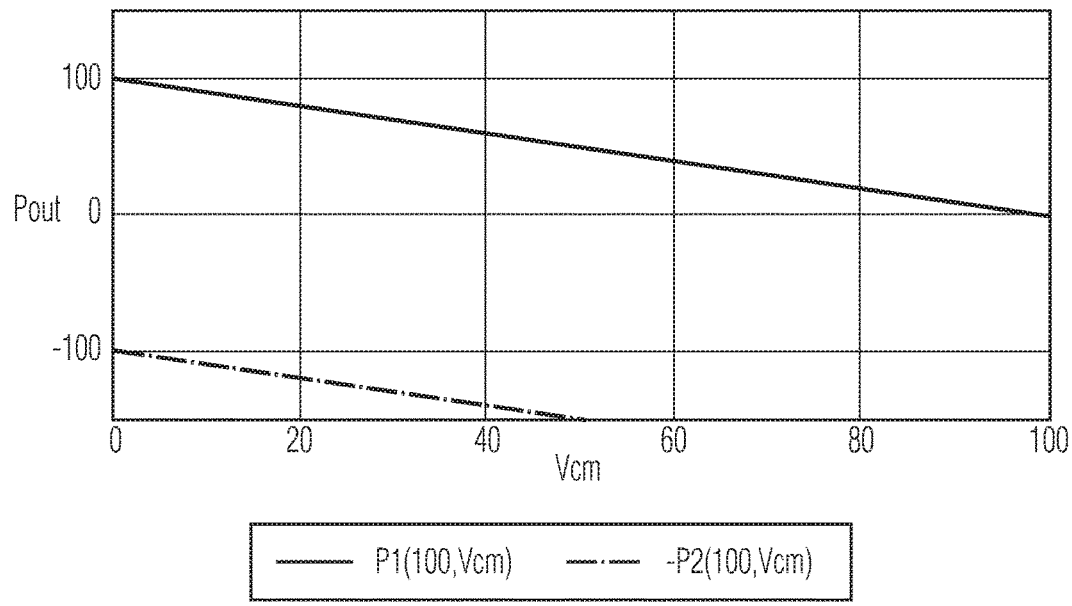
FIG. 22B illustrates an example of the dual output resonant converter being controlled by Vdm and Vcm.

FIG. 22B illustrates an example of the dual output resonant converter being controlled by Vdm and Vcm. In this example scaling factors of the converter are set such that Vdm=100V gives total power of 200 watts (100 watts in each output at symmetrical operation at Vcm=0), and a Vcm of 100V shifts 100 watts of power from Pout1 to Pout2.

Now assuming a transient situation, where the load is changed from 100 watts in both outputs (Vdm=100V, Vcm=0V) to no load at the Pout1 output and 100 watts at the Pout2 output (Vdm=50V, Vcm=50V), no load at Pout1 will cause the regulation loop to increase the error1 signal, however due to overshoots, it is likely that also the error signal overshoots and therefore reduces Vdm below 50 by factor k11, while Vdm=50V is needed to make Pout2=100 watts. Especially when this is a load step to no load, the error signal can over react because of overshooting of the output voltage, while the converter cannot produce negative power to reduce the output voltage. The error2 signal can partly compensate the power requirement for the other channel by reducing its error signal, but as the opto-coupler current cannot become negative, measures must be taken to make at least Vdm=50V via the path of error1.

An embodiment of a dual output resonant converter will now be described where the contribution of each error signal to the Vdm signal is limited such that the Vdm signal cannot be made lower than required by the maximum power level in the other channel. For example taking the converter of FIG. 22B, with the required power range for each output between 0 and 100 watts (200 watts max giving Vdm_max=100V), a limit may be set to maintain at least half of Vdm_max 50V for the error1 path to ensure a power of 100 watts can be delivered by the error2 path.

Also a limit should be set to maintain at least half of Vdm_max 50V for the error2 path to ensure a power of 100 watts can be delivered by the error1 path. Including this limit and the fact that the Vcm term can fully shift the available power between both outputs guarantees that both power ranges, even when the error signals overshoot. Some margin however may be added to not use the full amplitude of the available Vcm term. There are two reasons for adding this margin. First, due to the nonlinearity of the Vcm term when power in one channel comes close to zero, the margin provides a benefit. Second, the fact that output power slightly reduces when the asymmetry increases, slightly smaller power becomes available than expected, so the margin can compensate for this reduction.

Therefore Vdm_max based on total power at symmetrical operation should be multiplied with an additional factor k slightly larger than 1 with, for example, a typical range of 1.1-1.2, to take the second effects into account. For the first effect it is required to make the limit to the power based on Vdm term slightly lower than required by an additional factor m slightly larger than 1 with, for example, a typical range of 1.1-1.2, such that the error signal does not need the complete amplitude of the Vcm term to get the power to zero by shifting the residual power to the other output.

Figure 23:
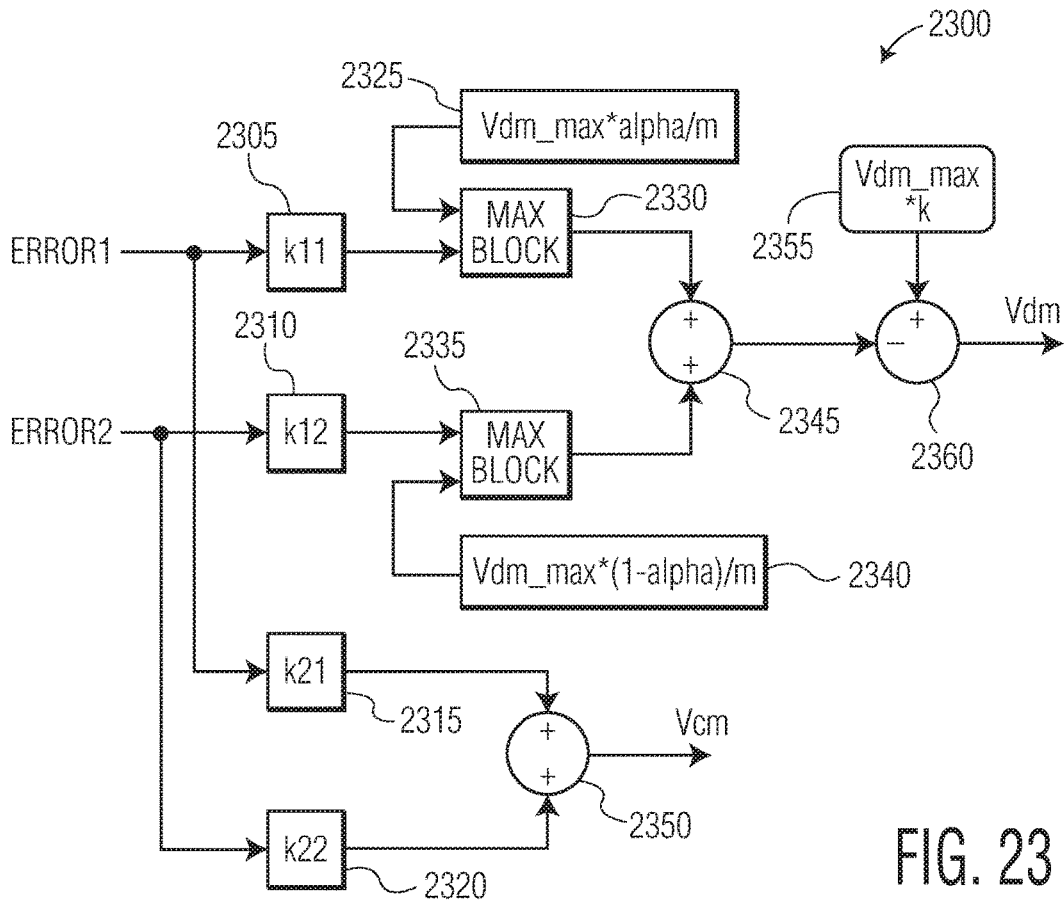
FIG. 23 illustrates an embodiment of a dual output controller that limits the value of Vdm.

FIG. 23 illustrates an embodiment of a dual output controller that limits the value of Vdm. The dual output controller 2300 includes multipliers 2305, 2310, 2315, and 2320, maximum detectors 2330 and 2335, Vdm limit blocks 2325 and 2340, adders, 2345, 2350, and 2360, and scaled Vdm_max block 2355. The dual output controller 2300 receives the error signals error1 and error2. The multipliers 2305 and 2315 receive the error1 signal as an input and multiplies the error1 signal by k11 and k21 respectively. The multipliers 2310 and 2320 receive the error2 signal as an input and multiplies the error2 signal by k12 and k22 respectively. The adder 2350 adds the outputs of the multipliers 2315 and 2320 to produce the control signal Vcm. The maximum detectors 2330 and 2335 receive values, Vdm_max*alpha/m and Vdm_max*(1−alpha)/m, from the limit blocks 2325 and 2340 respectively. The purpose of the factor m is described above. The maximum detectors 2330 and 2335 also receive the outputs from multipliers 2305 and 2310 respectively. The maximum detectors 2330 and 2335 output the input maximum value of the inputs received. The adder 2345 then adds the outputs of the maximum detectors 2330 and 2335. Then, adder 2360 subtracts the output from the adder 2345 from the value from the scaled Vdm_max block (Vdm_max*k). The purpose of the factor k is explained above.

If a value of 0.5 is selected for alpha, each output may produce a power between zero and half of the maximum power. If larger range of power is required for one output, a value for alpha different from 0.5 may be chosen. For example, taking a converter with the characteristics shown in FIG. 22 having a power range for the first output (corresponding to error1) between 0 and 150 watts and for the second output (corresponding to error2) between 0 and 50 watts (for a 200 watts max giving Vdm_max=100), a limit should be set for the error1 path to reserve at least 50 watts of power (Vdm_max=25) for the error2 path to ensure a power of 50 watts can be delivered by the error2 path when error2 is zero. Also a limit should be set on the error2 path to reserve at least 150 watts of power (Vdm_max=75) for the error1 path to ensure a power of 150 watts can be delivered by the error1 path when error1 is zero. This power range can be set by the factor alpha between 0 and 1.

The embodiment of FIG. 23 may be combined in various combinations with the embodiments of FIGS. 8, 12, 13, and 17, where the dual output controller 2300 replaces the dual output controllers in those embodiments, to thus add the features of limiting power associated with each output with the features of linearizing and clamping the control variable Vcm. In such a case, the output of the adder 2350 becomes the value □ Ec_desired used in the feedback loop.

Further, the embodiment of FIG. 23 may be combined in various combinations with the embodiments of FIGS. 11, 12, 13, and 17, where the dual output controller 2300 replaces the dual output controllers in those embodiments, to thus add the features of limiting power associated with each output with the features of linearizing and clamping the control variables duty cycle and frequency. In such a case, the output of the adder 2350 becomes the □ Ec_desired value used in the feedback loop, and the output of adder 2360 becomes the total power value used in the feedback loop.

FIGS. 6B and 6C illustrate dual output resonant converters using Vcap control and Vcr control. Both methods are used in practical resonant converters and are basically compatible, although there are slight differences, for example with the Vcr method, the DC component of Vcr is equal to Vsupply/2×duty cycle of the switching node, while the DC component using the Vcap method is zero (because it is a voltage across an inductor). As a capacitive divider is often used to reduce the signal amplitude of a few 100 volts to levels of a few volts as required for further processing, it could be an advantage to use the Vcap method as then the DC component does not have to be reconstructed.

For proper control of the Vcm control variable, the proper DC level needs to be applied. In a symmetrical situation with equal power at both outputs, Vcm equals 0. In practical situations however there are several reasons why the operation of the dual output resonant converter may not be symmetrical. First, there can be asymmetry in the transformer, because the physical windings of the secondary side cannot be at the same location. Second, the output voltages in a dual output resonant converter can be different from the symmetrical situation with equal reflected output voltages. Third, when the resonant capacitor is placed at ground side of the transformer, the DC value of the voltage across the resonant capacitor equals Vsupply/2×duty cycle, where duty cycle is the duration of a half-cycle related to the total period. Often a capacitive divider is used to divide the voltage to a low value that can be processed by the controller IC. Such a capacitive divider cannot divide the DC component, so therefore also the DC component of Vcm is undefined or badly defined. A resistive divider can be placed in parallel to define the DC component, however mismatch between both factors of the two voltage dividers due to component tolerances still results in too much asymmetry. Further, the resistive divider may introduce a phase shift due to parasitic capacitances or consume too much power because of its high resistance.

In a normal resonant converter with symmetrical operation, the DC component may be reconstructed by connecting the capacitive divider to a fixed voltage with a high resistance resistor and then adding an adaptive DC component based on measuring the duty cycle or ratio of currents in both half-cycles. For a dual output resonant converter, different powers occur for each half-cycle, so this method of reconstruction cannot be used.

An embodiment of a dual output resonant converter will now be described that reconstructs the proper DC component such that the required power can be delivered to both outputs. Features of this embodiment include: a check if one of the error signals is clipping to a minimum or maximum value as an indication that the desired power cannot be delivered; a check of a signal related to the each output indicating that an output reaches a no load situation; adding an additional offset term to the Vcm signal or to values that Vcm is compared to; a way to adapt the additional offset depending on clipping of one of the error signals; and the direction in which the offset is adapted is set by both clipping of the error signals and at what level in combination with information about each output reaching a no load situation or not.

Figure 24:
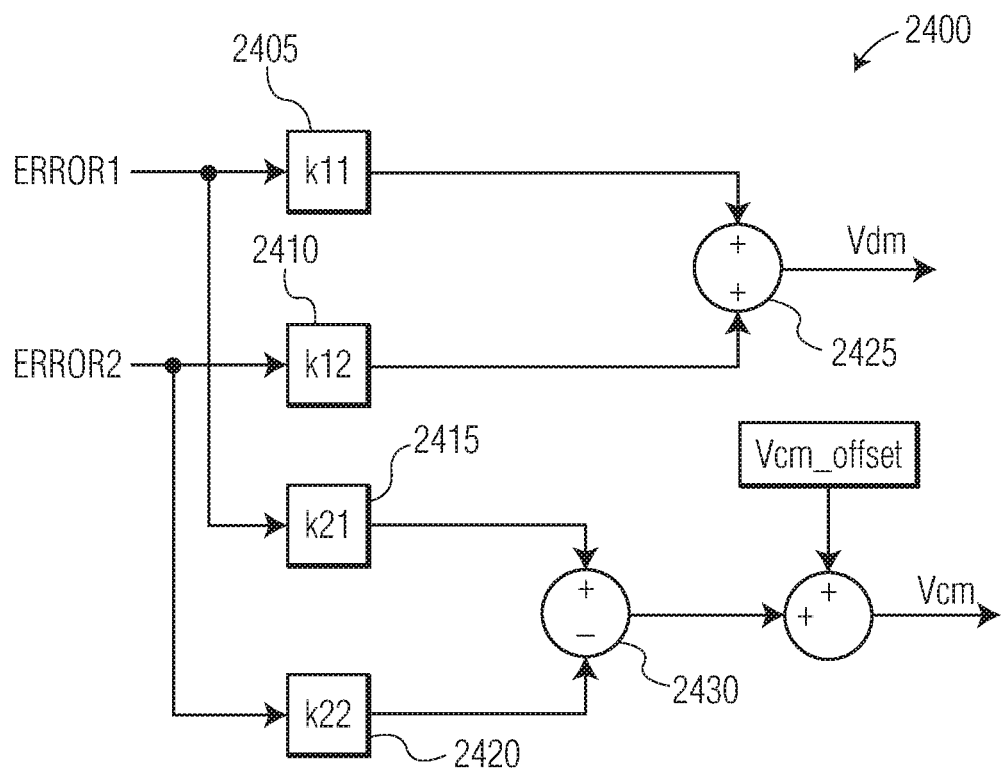
FIG. 24 illustrates a first embodiment of a dual output controller using a Vcm offset.

FIG. 24 illustrates a first embodiment of a dual output controller using a Vcm offset. This dual output controller 2400 is similar to other dual output controllers described above that implement the calculations for Vdm and Vcm based upon the error1 and error2 signals. Multipliers 2405, 2410, 2415, and 2420 variously multiply the error1 signals and error2 signals by constants k11, k12, k21, and k22 as shown. The adder 2425 adds outputs of multipliers 2405 and 2410 together to produce Vdm. The adder 2430 subtracts the outputs of multipliers 2415 and 2420 from one another to produce an initial value of Vcm. The adder 2435 then adds a Vcm_offset value 2440 to the output of the adder 2430 to produce Vcm.

When the DC component of the Vcm term is wrong too much power may go to one output, while too little power goes to the other output as opposed to the desired output values for the two outputs. For that reason, the additional term Vcm_offset is added to the Vcm control variable in order to shift power from one output to the other if such a mismatched situation occurs.

Figure 25:
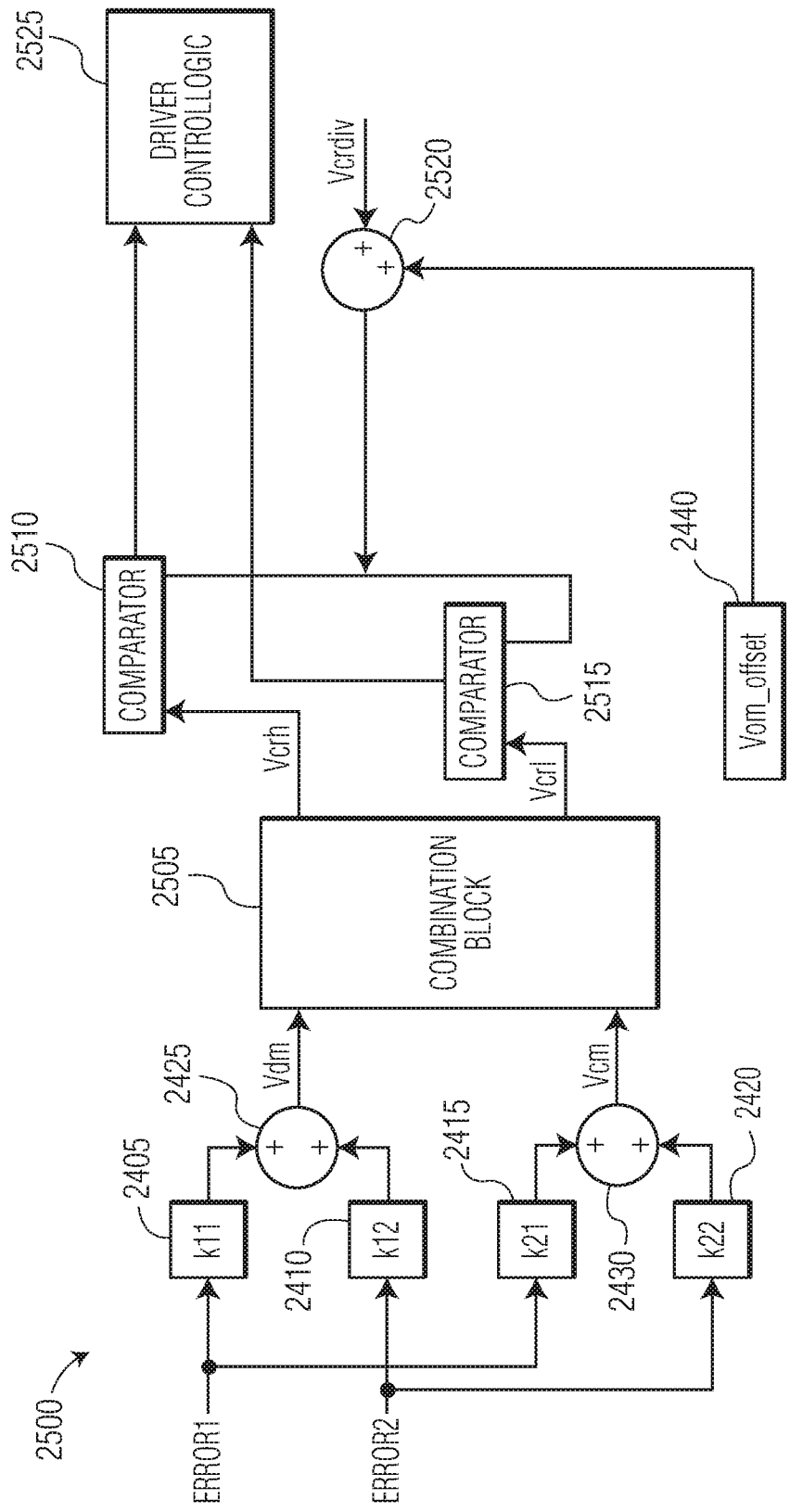
FIG. 25 illustrates a second embodiment of a dual output controller using a Vcm offset.

FIG. 25 illustrates a second embodiment of a dual output controller using a Vcm offset. This dual output controller 2500 is similar to the dual output controllers described above in FIG. 24, but instead implements the Vcm offset is implemented in the dual output resonant converter. The dual output controller 2500 produces values of Vdm and Vcm that implement the calculations for Vdm and Vcm based upon the error1 and error2 signals as described above. In this second embodiment, the Vcm_offset is used later in controlling the switching of the switches in the dual output resonant controller. This addition of the Vcm_offset may be implemented by injecting a current or charge into the capacitive divider described above used to measure Vcr. More specifically, this may be accomplished by the combination of the combination block 2505, comparators 2510 and 2515, adder 2520, Vcm_offset generator 2440, and the driver control logic 2525.

Figure 26:
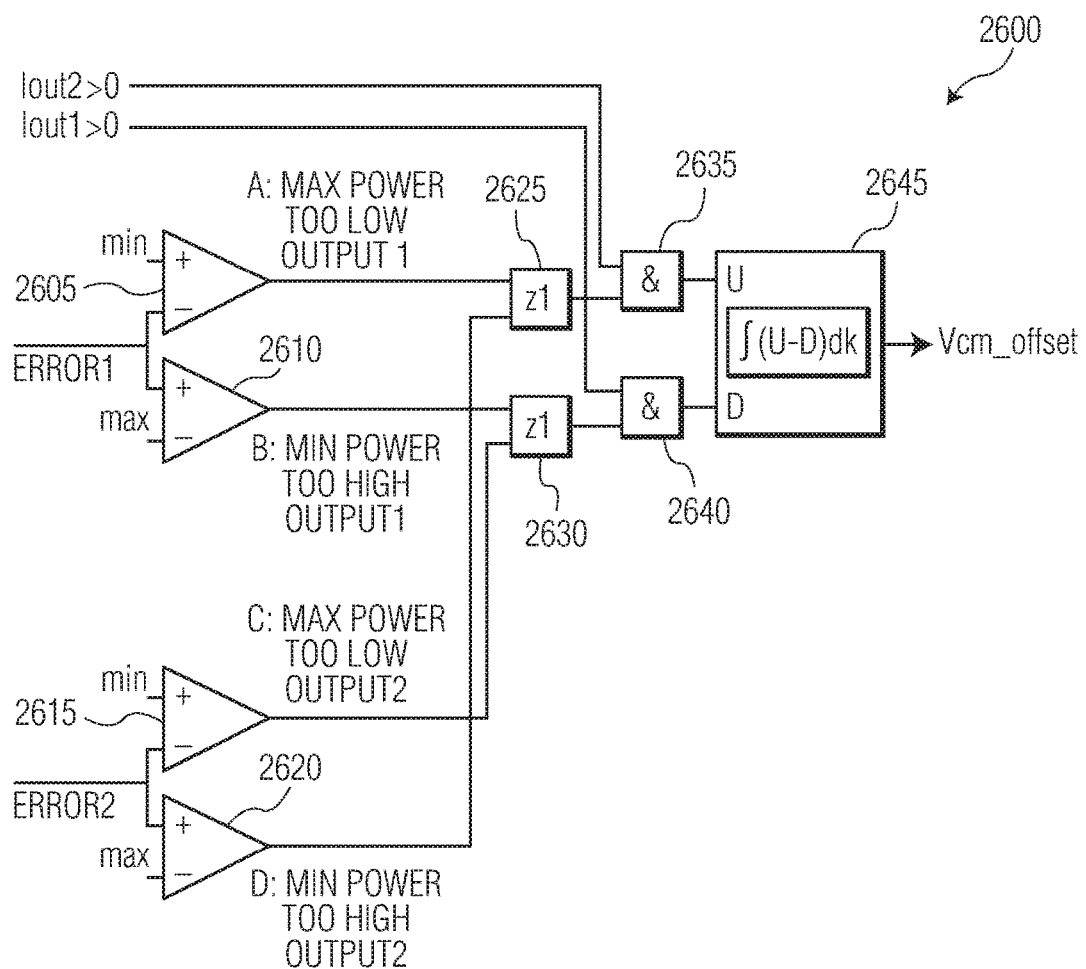
FIG. 26 illustrates an embodiment of a Vcm_offset circuit.

FIG. 26 illustrates an embodiment of a Vcm_offset circuit. The Vcm_offset circuit 2600 includes comparators 2605, 2610, 2615, and 2620, OR gates 2625 and 2630, AND gates 2635 and 2640, and integrator 2645. Comparator 2605 receives the error1 signal and an error1 minimum value to produce an output signal A that indicates that the maximum output power that can be delivered at output 1 is too low. Comparator 2610 receives the error1 signal and an error1 maximum value to produce an output signal B that indicates that the minimum output power that can be delivered at output 1 is too high. Comparator 2615 receives the error2 signal and an error2 minimum value to produce an output signal C that indicates that the maximum output power that can be delivered at output 2 is too low. Comparator 2620 receives the error2 signal and an error2 maximum value to produce an output signal D that indicates that the minimum output power that can be delivered at output 2 is too high. Under normal conditions, both error signals error1 and error 2 have a value between a minimum value and a maximum value. A regulated output Vout1 for example causes an error signal error1 to be within the minimum-maximum range as long as the load connected to Vout1 matches the power delivered by the converter to that output. When the load is increased above the maximum power that the output can deliver, the error signal adapts to the minimum or maximum, depending on the chosen polarity of the error signal. It is assumed, for example, that the error1 signal being at the maximum causes the maximum power to be delivered and the error1 signal being at the minimum causes the minimum power to be delivered. A properly dimensioned converter is capable of delivering the required maximum and minimum power, so then an error signal reaching maximum or minimum should not occur during steady state situations and means that the offset level is not correct. During transients it is possible that for a short interval the minimum or maximum levels are crossed, but depending on the chosen bandwidth of the main loop, this situation cannot take longer than a certain time, for example 500 usec. Only during startup or after a specific fault condition could it could take longer.

So if it is detected that an error signal is outside the limits for a certain time longer than an expected time, there could be a problem with the Vcm term and then the action is to slowly adapt the Vcm_offset signal in the required direction in order to shift power from one output to the other. As the main regulation loop also controls power delivery to both outputs, it is required that the Vcm_offset shifting mechanism has a bandwidth significantly lower than the bandwidth of the main loop to prevent instability due to interaction of both loops. OR gate 2625 receives the outputs A and D and counts if either A or D or A and D indicate that error1 and/or error 2 are out of range. If so, the OR gate 2625 produces an output that causes the value of the Vcm_offset term to change. OR gate 2630 receives the outputs B and C and counts if either B or C or B and C indicate that error1 and/or error 2 are out of range. If so, the OR gate 2630 produces an output that causes the value of the Vcm_offset term to change.

The AND gate 3635 receives the output of the OR gate 2625 and an indication that the output current at the second output Iout2 is greater than zero and produces an AND of the inputs. The AND gate 3640 receives the output of the OR gate 2630 and an indication that the output current at the first output Iout1 is greater than zero and produces an AND of the inputs.

Integrator 2745 receives the outputs of the AND gates 3635 and 3640 and produces a value of Vcm_offset as an output. The integrator 2645 may be implemented as an up/down counter. As the AND gates 2635 and 2640 produce output values, the integrator 2645 adjusts the value of Vcm_offset to compensate for the errors in the output powers. The logic function of FIG. 26 assumes a certain polarity of the error signals error1 and error2, so with a different polarity a different logic combination occurs, but the idea remains the same. The signal Vcm_offset may be for example a voltage, current, charge, or a digital value. Other implementations of the integrator 2645 may be used as well.

The signals Iout1>0 and Iout2>0 are included to prevent the activation of the Vcm_offset adaption as a zero load occurs, because in such situations the regulation loop always reacts in this way so when Iout=0 has been reached, the corresponding shift action is prevented by the logic, because it was already clear that the Vcm_offset term was capable of making no load.

In another embodiment, an additional functionality may be added when the system cannot deliver sufficient power to both channels. First, the action may be to do nothing. Second the values of k11 and k12 may be increased.

The embodiment of FIG. 26 using the Vcm_offset term may also be combined in various combinations with the embodiments of FIGS. 8, 12, 13, and 17. Further, the embodiment of FIG. 26 may be combined in various combinations with the embodiments of FIGS. 11, 12, 13, and 17. In this embodiment a signal duty cycle offset may be added so the duty cycle in FIG. 11.

In the embodiment of FIG. 8 a dual output resonant converter with a local feedback loop is presented to improve the orthogonal control performance as needed to prevent cross regulation problems between both outputs. At a no load situation for one of the two outputs, this new local feedback loop has zero loop gain, so the local feedback loop then becomes an open loop, causing one of the resonant converter control variables (Vcm) to drift away resulting in undesired effects, such as a time interval where the output power cannot be controlled properly, because Vcm change has no influence on output power, thereby disturbing the regulation loop for both outputs. In the embodiment of FIG. 2. 24-26 several solutions are proposed to limit the Vcm term such that the converter can deal with a no load situation at one output. Although both normal operation and no load operation at one output are significantly improved by the embodiment of FIG. 8, one problem remaining is that the changeover between both situations does give undesired transient effects. Such transient effects may disturb both outputs, for example, both the LED and low voltage outputs when used in an LCD TV with PWM dimming.

Now an embodiment that solves this problem in a more fundamental way by limiting the corresponding error signal instead of the Vcm signal will now be described. This embodiment leads to a much better performance during the changeover situation between normal operation and no load at one output, because the required relation between Vcm and Vdm terms is maintained also during the changeover.

This embodiment may include the following features. The dual output resonant converter is controlled by state variables Vcm and Vdm, where the Vcm variable is included in a local feedback loop in order to improve linearity of the transfer from control input to power as discussed above with respect to FIG. 8. The embodiment includes a detector that detects if one of the outputs goes to a no load situation. Also, the embodiment includes a processing block including a sampling function that samples the Vcm signal when no load situation is reached or almost reached. The embodiment includes a local regulation loop that uses the sampled Vcm signal as reference and regulates/limits the actual Vcm value to a value slightly above the reference. This regulation loop generates a second error signal that is compared with the error signal from the main regulation loop. The minimum of both error signals is then taken as input for the controller such that the controller generates the proper Vcm and Vdm signal and the proper relation in between them to maintain orthogonal control.

Figure 27:
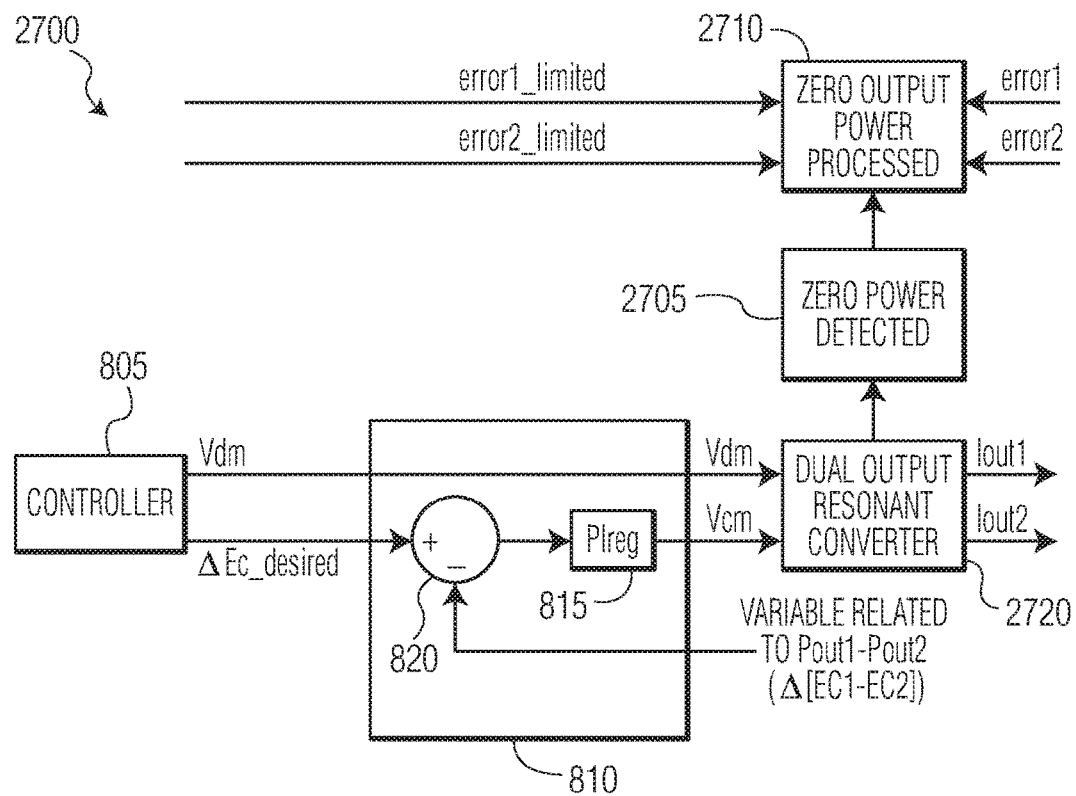
FIG. 27 illustrates an embodiment of a converter that limits the error signals.

The embodiment of FIG. 8 using local feedback to control Vcm is used as the basis for this embodiment. FIG. 27 illustrates an embodiment of a converter that limits the error signals. The converter 2700 includes a dual output resonant converter 2720, an error processor 805, and a feedback loop 810 including an adder 820 and regulator 815 as described above with respect to FIG. 8. The converter 2700 further includes zero power detector 2705 and a zero output power processor 2710. The zero power detector 2705 detects when the power at either of the two outputs of the dual output resonant converter 2720 becomes zero and outputs a signal indicating this condition. The zero power processor 2710 receives the two error signals error1 and error2 and produces limited error signals error1_lim and error2_lim based upon the output signal from the zero power detector 2705.

Figure 28:
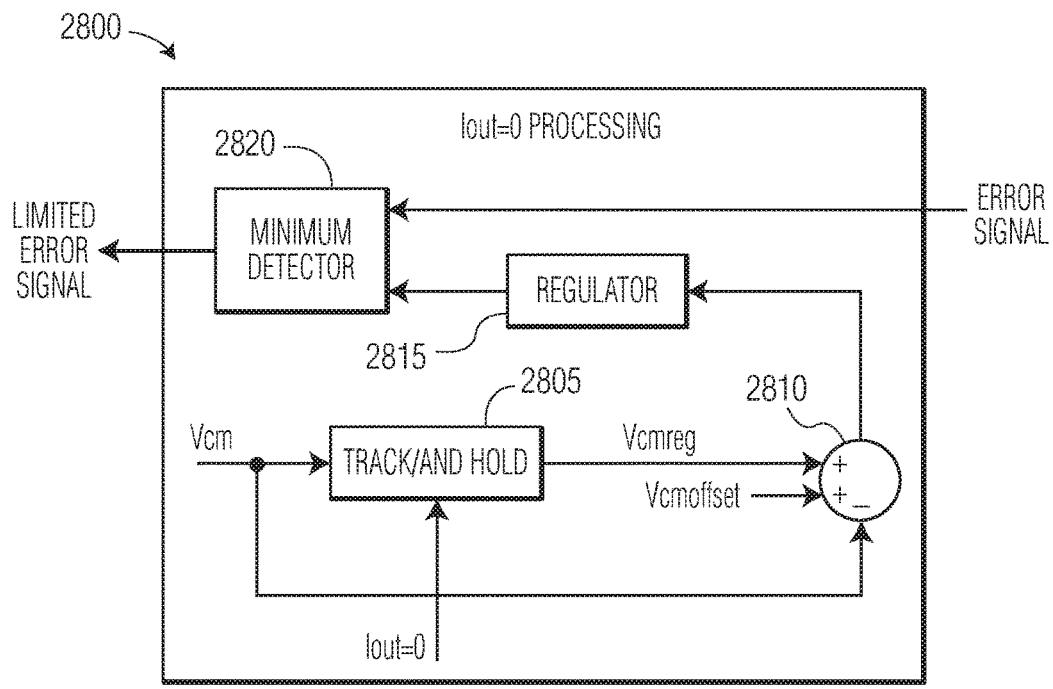
FIG. 28 illustrates an embodiment of zero output power processor.

FIG. 28 illustrates an embodiment of zero output power processor. The zero output power processor 2800 includes a track and hold circuit 2805, an adder 2810, a regulator 2815, and minimum detection circuit 2820. The zero output power processor 2800 receives an error signal that may be either the error1 signal or the error2 signal. Processing for only one error signal is shown, but the same processing would be performed on the other error signal in the same manner. The error signals error1 and error2 indicate the status of the outputs at the secondary side of the dual output resonant converter.

The track and hold circuit 2805 receives the current value of Vcm as an input along with the output of the zero output detector and outputs a value Vcmreg. When the output power becomes zero, then the track and hold circuit 2805 sets the value of Vcmreg to the value of Vcm at the time the output power become zero. Otherwise, the track and hold circuit 2805 simply sets the value of Vcmreg to the current value of Vcm in a tracking mode. The adder 2810 computes the value Vcmreg+Vcmoffset−Vcm. The output of the adder 2810 is input to the regulator 2815 which then produces a signal indicative of the error signal. The regulator may be any type of regulator including, for example, PI regulators, proportional integrators, differentiation regulators, etc. The minimum detector 2820 receives the error signal and the output of the regulator 2815 and outputs the minimum value of the two inputs.

As long as power is delivered to both outputs of the dual output resonant converter 2720, the track and hold circuit 2805 is in track mode, which means that the signal Vcmreg equals Vcm and the adder output equals the Vcmoffset signal which is the input for regulator 2815. The output of 2815 then integrates to a high level that is always larger than the error signal such that the error signal directly passes to the limited error signal. As optional feature, the Vcmreg output is only updated at a certain time during the switching cycle as Vcm includes ripple due to the main regulation loop reacting to the output current pulses of the converter. The minimum detector 2820 input from the regulator 2815 is then high and the error signal is directly passed to the limited error signal output. In this situation, the zero power detector 2705 does not affect the operation of the dual output resonant converter 2720. In this embodiment, a minimum detector is used related to the polarity of the error signal. It is noted that the opposite polarity of the error signal is also possible and then a maximum detector would be used instead of the minimum detector.

When one output of the dual output resonant converter 2720 comes close to zero load, this is detected by the zero power detector 2705. This detected event is then processed by the zero output power processor 2710 as follows. First the track and hold circuit 2805 holds value of the Vcm term in the value Vcmreg. Now the difference between Vcm and Vcmreg drives the regulator 2815 and overrules the normal error signal as long as Vcm is on the wrong side of Vcmreg+Vcmoffset. The result is that this local feedback loop sets the limited error signal to the proper value such that the proper Vcm signal occurs when just getting to no load. Due to the Vcmoffset term, Vcm will settle at a value just below the border of zero power. As the local loop allows both positive and negative values of Vcmreg−Vcm+Vcmoffset, it is possible to limit the system really at zero output power with some margin.

The zero power detector 2705 may be implemented as described in FIGS. 13, 14, 17, and 18, which include: the actual sensing of the output current and limit Vcm when output current gets close to zero; sensing of the voltage at an aux winding and detect if the voltages gets larger than the reflected output voltage during a certain time interval during a half-cycle; or checking if CCM operation occurs.

Although the zero output power processor 2710 according to FIG. 28 can actually regulate the output current to zero, the relationship between Vcm and output current can change due to for example changing supply voltage of the converter or changing output voltage, because of a load connected to the output where the output voltage is temperature and current dependent. Therefore it is not sufficient to sample Vcm only once when zero load occurs.

This problem may be solved by regularly driving the loop towards the point where power starts to flow and then resampling the corresponding Vcm value. There are several options possible to realize this, for example by overruling the error signal of slowly adapting the level of Vcmoffset.

Figure 29:
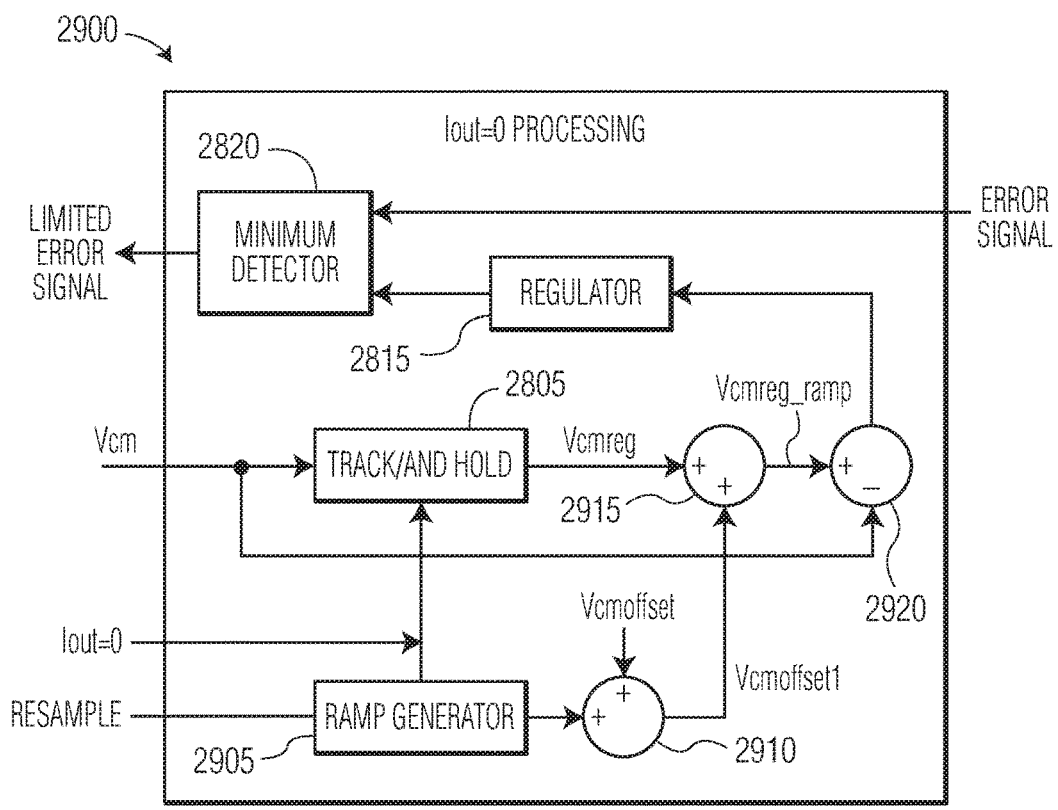
FIG. 29 illustrates an embodiment of zero output power processor based upon slowly adapting the level of Vcmoffset.

One embodiment based on slowly adapting the level of Vcmoffset is given in FIG. 29. Based on zero output power processor 2710 as shown in FIG. 28, the following items are added: a ramp generator 2905 and adders 2910, 2915, and

2920. The track and hold circuit 2805, regulator 2815, and the minimum detector 2820 are the same as described with respect to FIG. 28.

An additional input resample is added that drives the ramp generator 2905. This ramp generator 2905 generates an additional offset added to Vcmoffset by adder 2910 making a total offset Vcmoffset1. As the idea is to go back to the border where power is just delivered, the ramp generator 2905 produces a negative ramp effectively compensating Vcmoffset.

When the resample pulse is received, the ramp generator 2905 generates a ramp signal that starts from zero, slowly increasing its amplitude. The result will be that the regulator starts adapting its output such that the limited error signal changes such that the controller starts adapting Vcm in the direction of increasing the power at the no load output. As a result, the Iout=0 signal will change to zero when the ramp reaches a sufficient amplitude, indicating that power starts to flow in the output.

When Iout=0 goes false (output current starts to flow) then the track and hold circuit 2805 will enter track mode and therefore starts passing the actual value of Vcm to its output Vcmreg as long as Iout=0 is false.

At the same time as result of Iout=0 going false, the ramp is stopped and reset to zero. So then the original Vcmoffset is added to Vcmreg. This offset being integrated by the regulator 2815 overrules the error signal again and reduces the power at the output until finally it reaches zero again. As result, Iout=0 changes to true and causes the track and hold circuit 2805 to hold the last Vcm value that now again corresponds to the output power being equal to zero. Including the Vcmoffset term guarantees that the local loop including regulator 2815 and minimum detector 2820 causes Vcm to adapt to a level giving no load again.

This procedure is repeated regularly. As power delivery can be detected within a few switching cycles while the power produced can be very low due to a limited ramp-up speed, the effective power generated can be limited to less than 50 mwatt for a 100 watt led power system This small power can easily be dissipated in a parallel resistor or additional load connected to a second winding with a rectified output generating power during the same half-cycle as the LED output, so the LEDs are kept fully off.

The procedure can also be activated when an event is detected from which it can be expected that the relation between Vcm and the point of no power delivery has changed, for example after a mains dip or a large load step.

If for whatever reason power starts to flow in the output that was regulated to no load, this will automatically cause the steps of Iout=0 going false to Iout=0 going back to true to happen thereby automatically updating to the proper Vcm and Vcmreg level.

Figure 30:
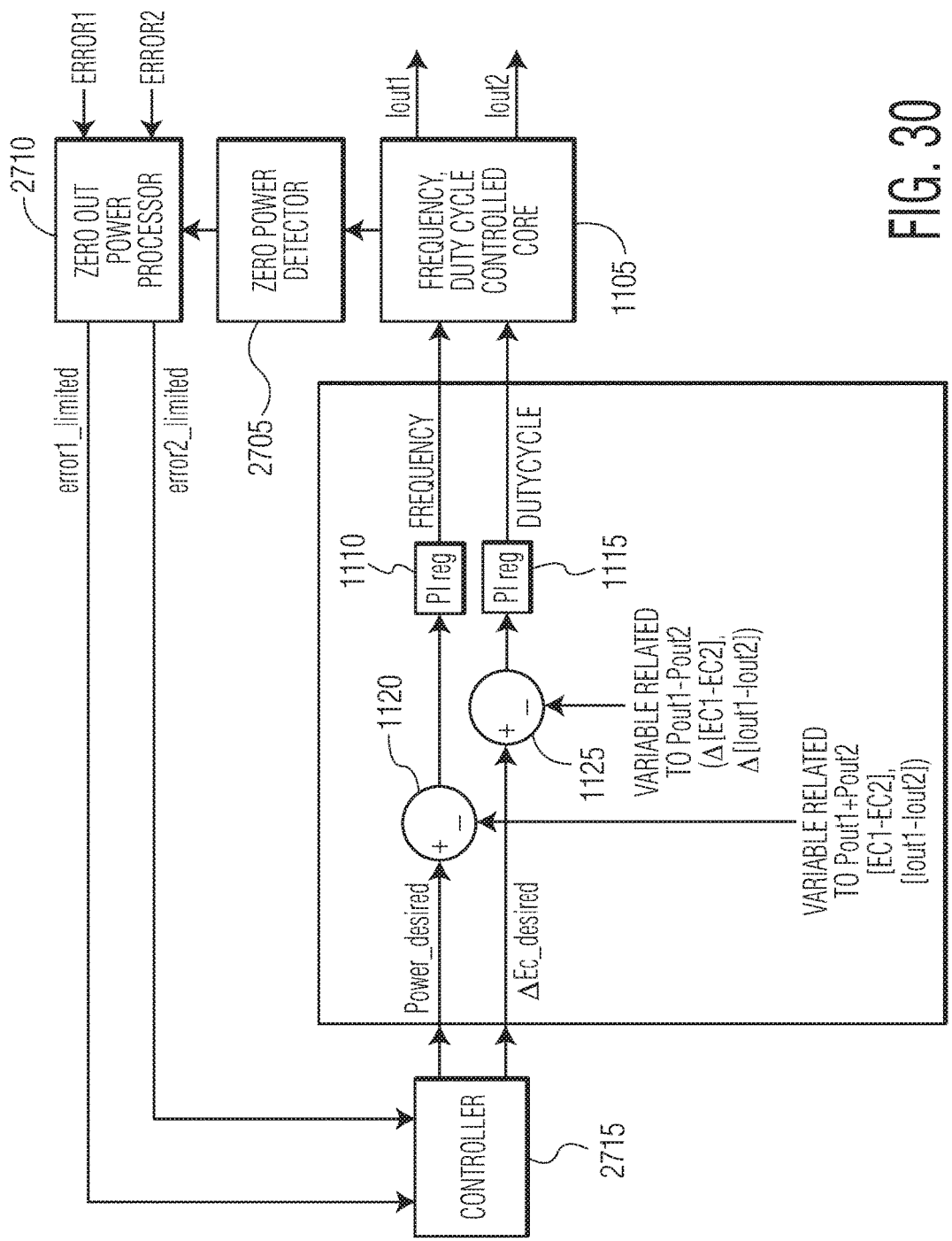
FIG. 30 illustrates an embodiment of a converter that limits the error signals using duty cycle and frequency controls.

The embodiment of FIG. 27 may also be applied more generally such as for example with a dual output resonant converter core being controlled by duty cycle and switching frequency such as illustrated in FIG. 11. FIG. 30 illustrates an embodiment of a converter that limits the error signals using duty cycle and frequency controls. Such a converter may be controlled by a similar controller with one or more local feedback loops in order to linearize the transfer from control input to output variable, such as given in FIG. 30 including two feedback loops for both frequency and duty cycle. The converter in FIG. 30 operates the same as the converter in FIGS. 27-29. In this case the duty cycle variable drives the asymmetry of the converter instead of Vcm and therefore relates to the point where one output goes to no load. In this case the duty cycle can then be used as input for the input of the track and hold circuit 2805.

Although the outputs of the resonant converter are described in terms of output voltages, Vout1 and Vout2, it should be understood that the control techniques described herein are applicable to and may be implemented in response to the voltage at the outputs, Vout1 and Vout2, the currents at the outputs, Iout1 and Iout2, the power at outputs, Pout1 and Pout2, or some combination thereof. In some instances, the term "voltage/current" is used to refer to the voltage and/or the current, such that the term may refer to the voltage, may refer to the current, or may refer to both the voltage and the current. The term may also refer to power, which is a function of voltage and/or current.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A power converter comprising:
    a dual output resonant converter including a first output, a second output, a common mode control input, and a differential mode control input, wherein a voltage/current at the first output and a voltage/current at the second output are controlled in response to a common mode control signal received at the common mode control input and a differential mode control signal received at the differential mode control input; and a dual output controller including a first error signal input, a second error signal input, a delta power signal input, a common mode control output, and a differential mode control output, wherein the dual output controller is configured to generate the common mode control signal and the differential mode control signal in response to a first error signal received at the first error signal input and a second error signal received at the second error signal input, wherein the first error signal is a function of the voltage/current at the first output and the second error signal is a function of the voltage/current at the second output, and wherein the common mode control signal is output from the common mode control output and the differential mode control signal is output from the differential mode control output, wherein the common mode control signal is generated using a feedback loop that uses a desired delta power signal based upon the first error signal and the second error signal and a delta power signal that is a function of the difference in output power at the first output and the second output.

2. The power converter of claim 1, wherein the dual output controller is configured to generate the common mode control signal and the differential mode control signal in response to the first error signal and the second error signal by precalculating a control variable matrix and generating the common mode control signal and the differential mode control signal as a function of the first and second error signals and the control variable matrix.

3. The power converter of claim 2, wherein the control variable matrix includes variables k11, k12, k21, and k22, wherein the desired delta power signal and the differential mode control signal are generated as:

desired_delta_power=first error signal·$k21$+second error signal·$k22$; and

Vdm=first error signal·$k11$+second error signal·$k12$.

4. The power converter of claim 1, wherein the feedback loop further comprises:
an adder configured to calculate a difference between the desired delta power signal and difference in output power at the first output and the second output; and
a regulator configured to receive the output of the adder to generate the common mode control signal.

5. The power converter of claim 1, further comprising a clamping circuit configured to clamp the common mode control signal to a range of values.

6. The power converter of claim 5, wherein the clamping circuit further comprises:
a power detector configured to produce an indication signal when the output power of the first output approaches zero; and
a limit detector configured to receive the common mode signal and the indication signal to produce a limited common mode signal based upon the range of values.

7. The power converter of claim 6, wherein the limit detector is further configured to produce an overrule signal that is received by the feedback and loop and that stops the operation of the feedback loop when the common mode signal is limited.

8. The power converter of claim 6, wherein the power detector includes a reference input configured to receive a reference signal and a voltage/current input that receives a voltage/current signal from the first output, wherein the indication signal produced based upon the reference signal the voltage/current signal from the first output.

9. The power converter of claim 6, wherein the power detector includes an auxiliary voltage input configured to receive an auxiliary voltage signal from an auxiliary coil coupled to a secondary of the dual output resonant converter, wherein the indication signal is produced based upon the auxiliary voltage signal.

10. The power converter of claim 9, wherein the power detector is configured to detect that the auxiliary voltage is below threshold value based upon a maximum detected auxiliary voltage value.

11. The power converter of claim 6, wherein the power detector includes an auxiliary voltage input configured to receive an auxiliary voltage signal from an auxiliary coil coupled to a secondary of the dual output resonant converter and a switching node voltage input that receives a switching mode voltage signal from a switching node in the dual output resonant converter, wherein the indication signal is produced based upon the auxiliary voltage signal and the switching node voltage signal indicating the beginning a continuous conduction mode (CCM) of operation of the dual output resonant converted.

12. The power converter of claim 11, wherein the power detector further comprises:
a zero crossing detector configured to determine a first time when the auxiliary voltage crosses zero;
a start slope detector configured to determine a second time when the switching node voltage starts to have a slope; and
time difference detector configured to determine a difference between the first time and the second time,
wherein the time difference indicates the beginning of the CCM of operation of the dual output resonant converted.

13. A power converter comprising:
a dual output resonant converter including a first output, a second output, a duty cycle control input, and a frequency control input, wherein a voltage/current at the first output and a voltage/current at the second output are controlled in response to a duty cycle control signal received at the duty cycle control input and a frequency control signal received at the frequency control input; and
a dual output controller including a duty cycle control output and a frequency control output, wherein the dual output controller is configured to generate the duty cycle control signal and the frequency control signal in response to the voltage/current at the first output and a voltage/current at the second, output,
wherein the duty cycle control signal is generated using a first feedback loop that uses a desired delta power signal based upon the voltage/current at the first output and a voltage/current at the second output and a delta power signal that is a function of the difference in output power at the first output and the second output, and
wherein the frequency signal is generated using a second feedback loop that uses a desired total power signal based upon the voltage/current at the first output and a voltage/current at the second output and a total power signal that is a function of the total power at the first output and the second, output.

14. The power converter of claim 13, wherein:
the first feedback loop further comprises:

an adder configured to calculate a difference between the desired delta power signal and difference in output power at the first output and the second output; and a regulator configured to receive the output of the adder to generate the duty cycle control signal; and the second feedback loop further comprises:

an adder configured to calculate a difference between the desired total power signal and total output power at the first output and the second output; and a regulator configured to receive the output of the adder to generate the frequency control signal.

15. The power converter of claim 14, further comprising a clamping circuit configured to clamp the duty cycle control signal to a range of values.

16. The power converter of claim 15, wherein the clamping circuit further comprises:

a power detector configured to produce an indication signal when the output power of the first output approaches zero; and a limit detector configured to receive the duty cycle control signal and the indication signal to produce a limited duty cycle control signal.

17. The power converter of claim 14, further comprising a clamping circuit configured to clamp the frequency control signal to a range of values.

18. The power converter of claim 17, wherein the clamping circuit further comprises:

a power detector configured to produce an indication signal when the output power of the first output approaches zero; and a limit detector configured to receive the frequency control signal and the indication signal to produce a limited frequency control signal.

* * * * *